US012292908B1

(12) United States Patent
Chopra et al.

(10) Patent No.: US 12,292,908 B1
(45) Date of Patent: May 6, 2025

(54) ATTRIBUTE EXTRACTION FROM TEXT SOURCES

(71) Applicant: Tredence Inc., San Jose, CA (US)

(72) Inventors: Ankush Chopra, Bangalore (IN); Aravind Chandramouli, Bangalore (IN); Mohammed Sameer Khan, Pune (IN); Paarth Ajay Shrivastava, Bangalore (IN); Shubham Sharma, Jalandhar (IN); Soumendra Mohanty, Bangalore (IN)

(73) Assignee: Tredence, Inc., San Jose, CA (US)

( * ) Notice: Subject to any disclaimer, the term of this patent is extended or adjusted under 35 U.S.C. 154(b) by 0 days.

(21) Appl. No.: 18/978,862

(22) Filed: Dec. 12, 2024

(51) Int. Cl.
*G06F 16/3329* (2025.01)
*G06F 9/54* (2006.01)
*G06F 16/334* (2025.01)
*G06F 16/338* (2019.01)
*G06F 40/58* (2020.01)
*G06F 40/284* (2020.01)

(52) U.S. Cl.
CPC ............ *G06F 16/3329* (2019.01); *G06F 9/54* (2013.01); *G06F 16/3344* (2019.01); *G06F 16/338* (2019.01); *G06F 40/58* (2020.01); *G06F 40/284* (2020.01)

(58) Field of Classification Search
CPC .................................................. G06F 16/3329
See application file for complete search history.

(56) References Cited

U.S. PATENT DOCUMENTS

| 10,949,907 B1 | 3/2021 | Jain et al. |
| 11,010,768 B2 | 5/2021 | Kanani et al. |
| 11,341,170 B2 | 5/2022 | Chandrasekhar et al. |
| 2014/0136549 A1 | 5/2014 | Surya et al. |
| 2018/0349965 A1 | 12/2018 | More |
| 2022/0121884 A1* | 4/2022 | Zadeh .................... G06N 3/006 |

FOREIGN PATENT DOCUMENTS

| CN | 103235803 B | 12/2016 |
| CN | 106777275 B | 3/2018 |

* cited by examiner

*Primary Examiner* — Van H Oberly
(74) *Attorney, Agent, or Firm* — Kilpatrick Townsend & Stockton LLP

(57) ABSTRACT

Embodiments include a method. The method includes receiving, by the computer system, a first input. The method includes generating, by at least using a language detection model, a set of predicted languages. The method includes generating, using different translation models, a different language translation of the first input for each language in the set of predicted languages. The method includes generating, using a first question-answer model, a set of answers. The method includes performing a distribution-based correction, by at least using a distribution source and at least one answer included in the set of answers, to determine the attribute represented by the arbitrary values included in the first input. The method includes causing a device to present a recommendation based at least in part on the attribute represented by the arbitrary values included in the first input.

20 Claims, 13 Drawing Sheets

ATTRIBUTE EXTRACTION FROM TEXT SOURCES

BACKGROUND

In the field of product description management, conventional systems often grapple with a range of challenges stemming from the diversity, volume, and complexity of the data involved. These systems typically rely on a mix of manual processes and automated tools to handle product descriptions that vary widely in language, format, and content. Manual tagging and attribute extraction are common practices but are labor-intensive and susceptible to human error, making them inefficient for large-scale operations. Automated systems, including those leveraging natural language processing (NLP) and machine learning (ML), aim to streamline these tasks but frequently encounter difficulties in managing multilingual data and the intricacies of real-world product descriptions.

A significant issue with existing systems is their dependence on data from multiple sources, such as marketing research firms and Point of Sale (POS) data providers. This data is often stored in different formats, languages, and with different units of measurement, necessitating extensive normalization efforts to make it usable. Additionally, the sheer volume of product descriptions poses a considerable challenge. Conventional methods also struggle with maintaining consistency and accuracy, as human subjectivity in attribute extraction can lead to biases and discrepancies.

Despite advancements in NLP and ML technologies, the complexities of product description management continue to present significant hurdles, highlighting the need for more sophisticated and adaptable systems capable of handling diverse and voluminous data with minimal human intervention.

BRIEF DESCRIPTION OF THE DRAWINGS

Various embodiments in accordance with the present disclosure will be described with reference to the drawings, in which.

DETAILED DESCRIPTION

Figure 1:
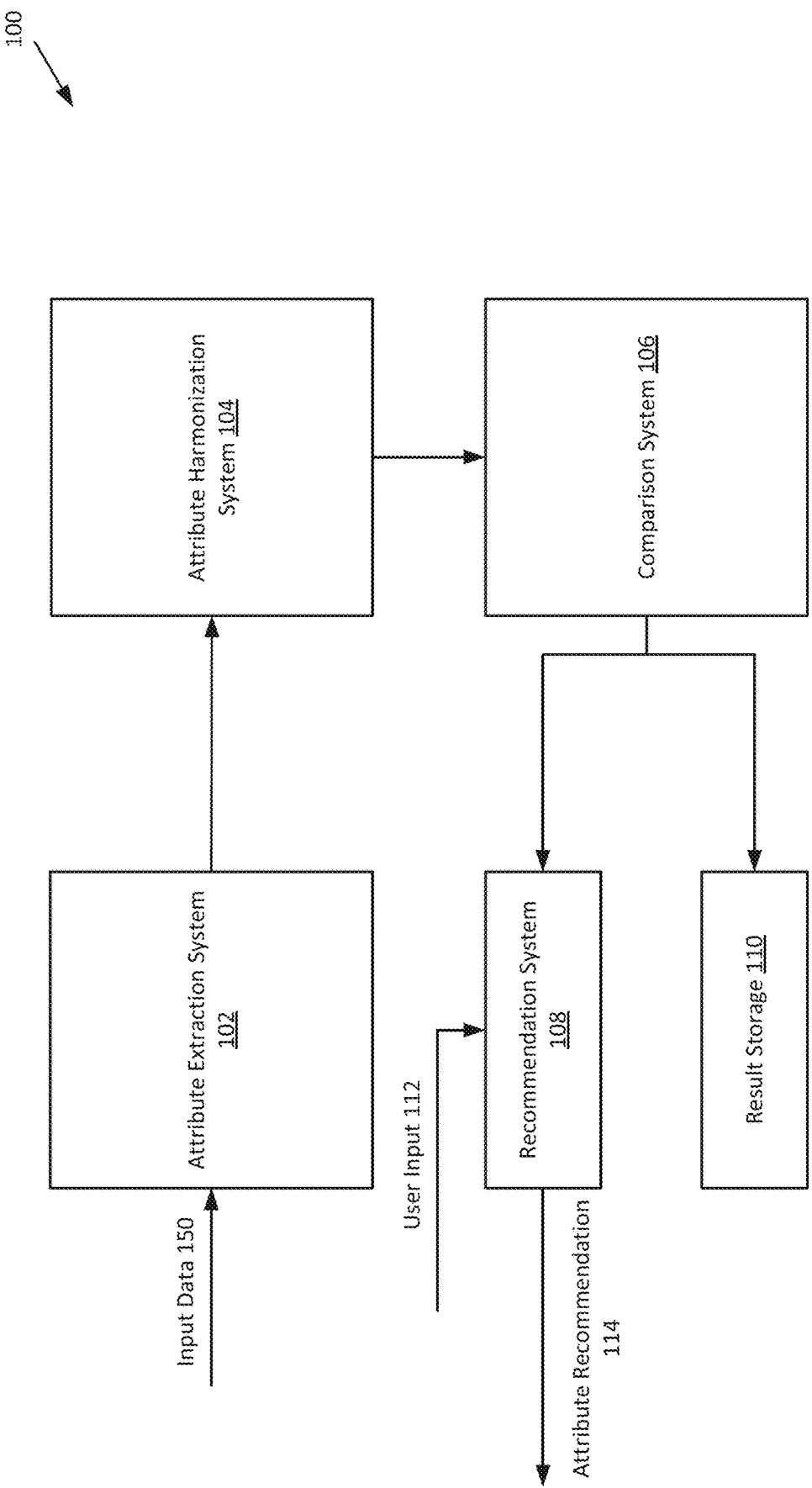
FIG. 1 illustrates a system that relies on the output of one or more matching modules to generate a recommendation, according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to an attribute analysis system (e.g., system 100 described below). The attribute analysis system is configured to obtain a set of input data and analyze the attributes represented by and included in the input data. The input data may be obtained from value-match systems. The input data may represent product (e.g., consumer products, product for sale, digital products, physical products, property, etc.). Embodiments can be configured to ingest the input data and automatically generate various statistics/insights about the input, regardless of the language (e.g., English, French, etc.) the input data is represented using, the units of measurement included in the input data, the keywords included in the input data, and/or formatting included in the input data of the input data set. In certain embodiments, the statistics determined by the attribute analysis system can be stored (e.g., in a database), can be presented by a user interface (e.g., a display), transmitted to another system, and/or used to inform determinations made by other systems (e.g., pricing determination systems).

The input data may be received from one or more systems. The systems may include data in an arbitrary language (e.g., English, French, and/or Spanish). In other words, the language can be arbitrary because the analysis system may be capable of analyzing the input data regardless of the language the input data is represented using. Similarly, the data received from the one or more systems may include arbitrary values (e.g., values representing a brand name, a size, a volume, a weight, a square footage, a price, etc.) and the values may be represented using a unit of measurement (e.g., feet, pounds, kilograms, centimeters, etc.). The units of measurement, languages, and values included in the data may not be consistent and may relate to the same product or set of products. In an example, input data may include first data about a first item and the first data (e.g., a product description) may include "beans 20 oz, $4" and may include second data about the first item and the second data may include "bean 5 ounce, 5 pesos." The attribute analysis system can process the first data and the second data and determine an average price per ounce, and other statistics. More complex and numerous data relationships can be represented when more data is analyzed and/or the data includes more attributes.

The data may include data that was processed using an attribute extraction and/or harmonization system, which can thereby enable the automated analysis. Embodiments of the present disclosure address shortcomings of conventional methods by providing an automated, scalable, and accurate solution for handling diverse and voluminous data.

The input data can be used to determine various statistics/insights (e.g., sales performance insights, customer behavior analysis, inventory management, pricing strategies, profitability analysis, containers used, volumes of products, and/or other statistics obtainable from the input data, etc.).

Previous techniques of analyzing the data included meticulous attention, involving manual analysis, rule based analysis, cleansing, and extraction of insights. Embodiments herein can automate the processing of the input data. These efforts can serve a multitude of critical functions, including informing future planning, facilitating cost and risk assessments, conducting market and competitor analyses, and identifying opportunities for new product development.

As an example, insights obtained from historical pricing data may be used for future pricing decisions. Pricing decisions may hinge on several factors, such as price elasticity, assortment, and pricing strategies of multiple entities. The identification of closely related products can be useful when determining the optimal price for a specific item. In this example, the attribute extraction described herein can offer an efficient, low-latency solution for making such pricing decisions.

Moreover, attribute analysis may consider a company's product portfolio (e.g., including pricing strategies). For instance, pricing for larger-sized SKUs should ideally encourage higher sales, often achieved by setting lower unit prices compared to smaller SKUs. The effective alignment of pricing strategies within one's product portfolio is vital for meeting sales objectives and maintaining a competitive edge in the market. Thus, determining similar product data (e.g., "product matching") within a system and across systems can play a role in analyzing the product data and can generate different statistics/insights.

Conventional systems for managing product descriptions face significant challenges, particularly in terms of variety, volume, and human subjectivity. In multi-national systems, product descriptions often come in multiple languages depending on the geographical region, necessitating the employment of personnel to tag and extract attributes in each location. This is not only resource-intensive but also inefficient. Furthermore, data from third-party sources such as marketing research firms, panel data, and Point of Sale (POS) data providers are typically stored in disparate formats. This data must be normalized before it can be effectively used, adding another layer of complexity and requiring additional resources.

The sheer volume of product descriptions presents another major hurdle. Systems, especially large ones, may have hundreds of thousands of product descriptions that need to be managed. When product descriptions (also referred to as input data) from other systems is included, the volume increases exponentially. This task is ongoing, requiring continuous updates and monitoring. Employing several personnel to manage this volume is not feasible due to the high costs and logistical challenges involved. The necessity for a scalable solution that can handle large volumes of data efficiently, continuously, and objectively is paramount. Further, an automated approach to the above can reduce resources used to process such data and store such data.

Human subjectivity further complicates the task of attribute extraction and product matching. Biases and inconsistencies can lead to incorrect or incomplete data tagging, resulting in similar products not being grouped together accurately. This not only affects the quality of data but also the reliability of any analysis based on that data. An algorithmic approach to attribute extraction can significantly mitigate these issues by providing consistent and objective data processing. In addition, the feasibility of manual processing diminishes rapidly when considering the potential matches between one or more systems or databases maintaining data. For example, matching 50,000 products from one database with 50,000 products from another database results in 2.5 billion possible combinations, a task that is impractical to perform manually due to the amount of time and processing resources such a task would require. Therefore, adopting automated and algorithmic solutions becomes essential for efficient and accurate data management and analysis.

Matching related products can be challenging because product descriptions are highly subjective, with different systems employing their unique styles, vocabulary, units of measurements, and taxonomies. This divergence makes direct comparisons difficult. Embodiments of the present disclosure can overcome these problems. For example, embodiments may leverage NLP and LLM-based methods, coupled with heuristics specifically designed for description matching, to facilitate product matching between different products. The embodiments may enable statistics to be obtained from the data received from multiple systems, regardless of the formatting, language, units, etc. used by the system. Furthermore, the statistics may be obtained in a manner that enables less resources, ensuring scalability and efficiency. These embodiments can provide real-time insights by integrating with various data sources, allowing for up-to-date and comprehensive analysis. Additionally, these embodiments can utilize machine learning models to continuously improve the accuracy the analysis performed. The embodiments can be integrated with existing systems, reducing the need to extensive reconfiguration or data migration.

Certain embodiments of the present disclosure provide various technological advantages over a conventional computer system for managing product descriptions. For example, certain embodiments described herein offer domain-independent solutions utilizing advanced Question Answering (QA) neural network models, which are more robust and adaptable than traditional rule-based methods. Further, certain embodiments can handle multilingual data and can extract attributes in English, combined with a multi-level distribution-based correction module, ensuring high accuracy and reliability. Certain embodiments can utilize an Extract-Transform-Extract (ETE) method and extract attribute values without prior knowledge, which can further improve performance. Additionally, embodiments can effectively handle domain-dependent acronyms, resolve conflicting values, and provide attribute harmonization. Further, novel distribution and cross-distribution corrections, along with graph-based post-processing methods, can be used to enhance the quality of the extracted data, offering a scalable and highly accurate solution compared to conventional systems.

Although some examples used in the application discuss Consumer Packaged Goods (CPGs), it should be understood that the embodiments are not domain dependent and can be used to analyze data from databases storing retail data, CPG data, industrial data, healthcare data, etc. According to some examples, the embodiments use a question-answer (QA) style neural network model to extract attributes enabling a more robust and adaptable system to other domains. According to some embodiments, input data can be descriptions in any language and attributes are extracted in English. A multi-level distribution-based correction module can then update the extracted attributes to their likely value.

FIG. 1 illustrates a system 100 that relies on the output of one or more systems to generate an attribute recommendation 114, according to some embodiments. Illustrated in FIG. 1 is input data 150, an attribute extraction system 102, an attribute harmonization system 104, a comparison system 106, a recommendation system 108, a result storage 110, a user input 112, and an attribute recommendation 114.

According to some embodiments, the system 100 relies product data obtained from one or more product data databases and/or product data generation systems. The product data may be included in input data 150. The system 100 may process the input data 150 to generate the attribute recommendation 114. As illustrated in FIG. 1, the system 100 receives input data 150 which can be the initial source of product descriptions and related information. The input data 150 can then be fed into the attribute extraction system 102, where specific attributes of the product description can be identified using techniques such as Question Answering (QA) models. The extracted attributes and the input data 150 may then be processed by the attribute harmonization system 104 to ensure consistency and standardization, resolving any variations or aliases. The harmonized attributes may then be passed to the comparison system 106, which analyses and compares the attributes to identify similarities and discrepancies, aiding in data refinement and validation. Insights from the comparison system 106 can be utilized by recommendation system 108 to generate attribute recommendations 114, such as optimal pricing or product suggestions based on analyzed input data 150. These attribute recommendations 114 and or insights from the comparison system can be stored in result storage 110 for future reference and action. A user can provide additional data or feedback through user input 112, which interacts with the stored data to update and refine the attribute recommendation 114. The system 100 can provide a comprehensive, and accurate approach to managing and extracting product attributes, enhancing the system's efficiency and reliability across various applications.

Attribute extraction can include extracting information about product attributes like brand, quantity, and/or product type. Information may be extracted using question-answering NLP models.

As described above, languages models often face challenges in distinguishing between brands and variants, resulting in instances where terms like "citron" are incorrectly extracted as brand from "1 51 citron volvic." However, during the translation process, certain information such as brand or volume should remain consistent (although there may be cases where this information changes). On the other hand, language dependent information, such as variant in "1 51 lemon volvic" may undergo changes. These distinctions can aid in identifying the portion of the product descriptions that are language independent, allowing for better understanding and handling of the data.

Figure 2:
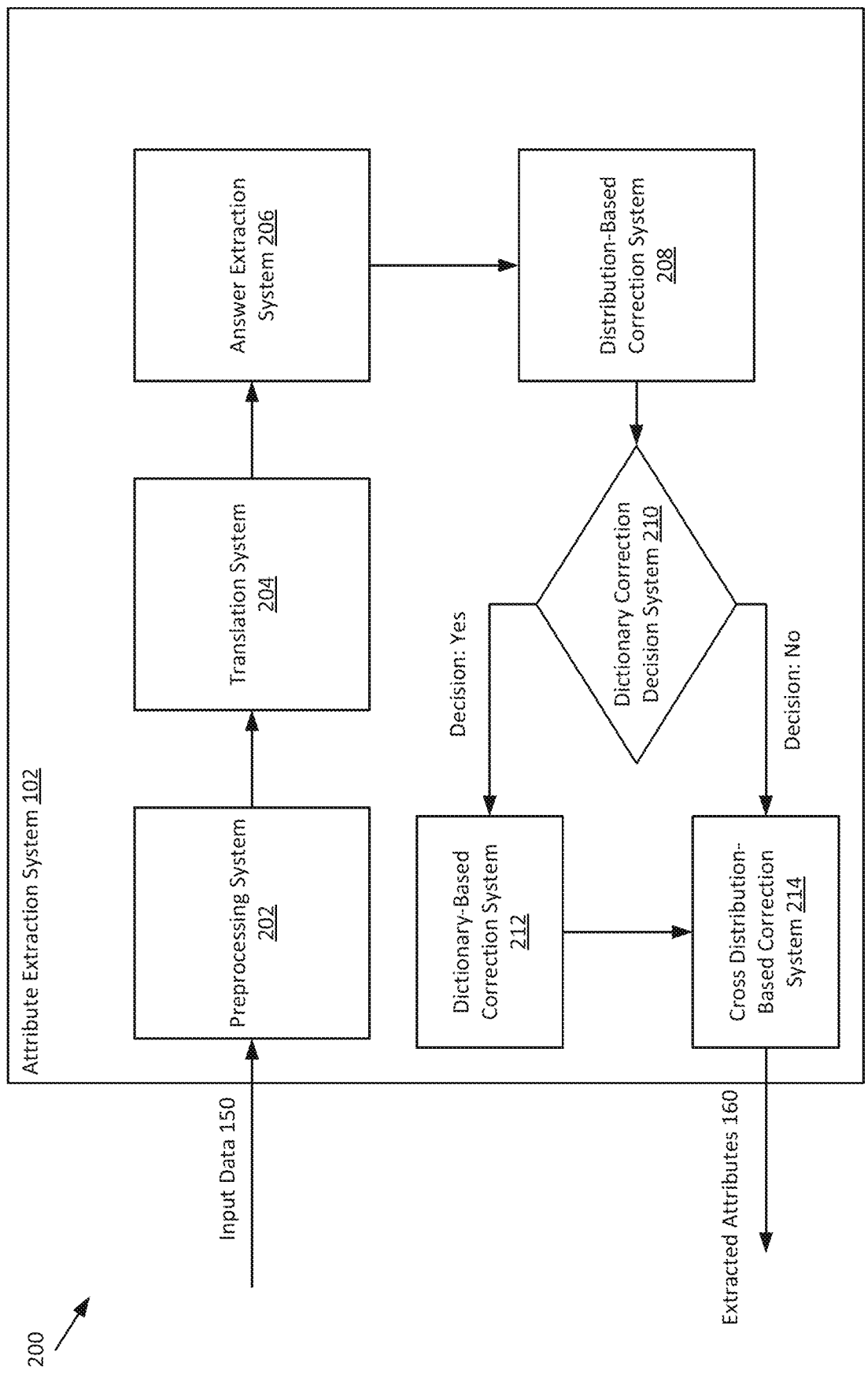
FIG. 2 illustrates an exemplary attribute extraction system, according to certain embodiments.

FIG. 2 illustrates an exemplary attribute extraction system 102, according to certain embodiments. Attribute extraction system 102 (e.g., the attribute extraction system 102 described with respect to system 100) receives data 150 and generates extracted attributes 160. The attribute extraction system 102 can include a preprocessing system 202, a translation system 204, an answering extraction system 206, a distribution based correction system 208, a dictionary correction decision system 210, a dictionary-based correction system 212, and/or a cross distribution-based correction system 214.

The input data 150 can be, for example, product description data from one or more databases. The databases may be databases such as a sales database, product catalogs, or material databases of a system (e.g., first party system, third part system), and/or a point of sale (POS) system. Examples of the product descriptions are given in Table 1, below:

TABLE 1

Product Description

Ben & Jerry non dairy chocolate fudge brownie 465 ml
Magnum mandel familienpackung eis 6x110ml tieforgefroren 660 ml
BLE 33CL FANTA ORANGE IVP
1 25 L OCEAN SPRAY CRANBER GRDE
SCHWEPPES SLIMLINE TONIC WATER 1 LITRE The product description examples shown in Table 1, above, illustrates common attributes amongst the rows of product descriptions may be brand, product, size, container, count, variant, etc. In some examples, some attributes may be added or omitted based on the use case. As discussed above, analyzing such product descriptions can be challenging. Common challenges faced in managing product descriptions include the need to extract information in a first language (e.g., English) from descriptions provided in one or more other languages.

Additionally, descriptions are often unclean, featuring issues such as missing spaces between words, non-UTF-8 characters, spelling and typographical errors, inconsistent formatting, incomplete data, and repetitive words. Attribute information may come in the form of acronyms without any mapping dictionary, necessitating interpretation (e.g., "Grapefruit Juice" as "grpfrt jc"). Furthermore, the same attribute information can appear in various forms that require normalization, such as size units being represented as Ounce, Oz, Ounces, etc.

According to some embodiments, the input data 150 can be input into attribute extraction system 102. The input data 150 can be input into preprocessing system 202 which can process the input data 150. The preprocessing system 202 can tackle the variability and inconsistencies in data from multiple sources by implementing several cleaning and normalization steps before artificial intelligence (AI) models are applied. These steps can include the removal of extra white spaces, case normalization, and conversion of non-ASCII characters to ASCII to ensure uniform text. Selective punctuation cleaning can be performed to retain necessary punctuation while removing extraneous ones. The preprocessing system 202 can also eliminate repeating words or n-grams to streamline the text. Additionally, the processing system 202 can insert and/or delete spaces appropriately between numeric and alphabetic characters using regular expressions, enhancing the readability and consistency of the data. This robust preprocessing layer ensures that the input data is clean, standardized, and ready for accurate AI processing.

The preprocessing system 202 can output the preprocessed description data which may be input into translation system 204. The translation system 204, described in greater detail with reference to FIG. 3, can translate any non-English descriptions into English, ensuring uniform language processing. Subsequently, the answer extraction system 206, described in greater detail with reference to FIG. 4, utilizes advanced techniques to extract relevant attributes from these translated descriptions. The answer extraction system 206 can interpret the text in each description to identify and isolate relevant attributes such as brand, variant, volume, and other key details. By running the answer extraction system 206 on both the original and translated descriptions, the answer extraction system 206 ensures a thorough and accurate extraction of attributes, accounting for any discrepancies or variations introduced during translation.

According to some embodiments, the extracted attributes from the answer extraction system 206 can be input into distribution-based correction system 208, described in greater detail with reference to FIG. 6. The distribution-based correction system 208 can analyze, for each attribute separately, the frequency and distribution of answers across the dataset, refining them based on their likelihood of being correct. Additionally, the dictionary correction decision system 210 can further determine whether dictionary-based corrections are needed. In certain embodiments, if the dictionary correction decision system 210 determines that dictionary-based corrections are needed, the dictionary-based correction system 212 can use a predefined set of attribute values to further correct and standardize the data. Details regarding the dictionary-based correction system 212 are described in greater detail with reference to FIG. 7. Further, the cross distribution-based correction system 214 can add another layer of refinement by comparing an attribute's value against the distributions of other attributes. These attribute value being corrected are those that resulted from corrections applies to the outputs of different models and translations of the same attribute. Details regarding the cross distribution-based correction system 214 are described in greater detail with reference to FIG. 8. The extracted attribute(s) 160 can be output by the attribute extraction system 102. The output of attribute extraction system 102 can be input into attribute harmonization system 104 as illustrated in FIG. 1 for further use. The interdependent and combined features illustrated in FIG. 2 can be used to ensure a comprehensive, accurate, and robust approach to managing and extracting product attributes from diverse and multilingual product descriptions.

To illustrate, a product description can be translated by a translation model included in the translation system 204 into English assuming N possible source languages. In other words, N number of translations are performed on the product description to generate N number of translations of the product description. Additionally, M number of question-answering models can be used to extract attributes and pass these attributes into an answer correction module (e.g., included in the distribution-based correction system 208). The extracted candidate attributes can be assigned the most appropriate attribute as per the product description. Additionally, rule-based improvements can be implemented to output the final values.

Figure 3:
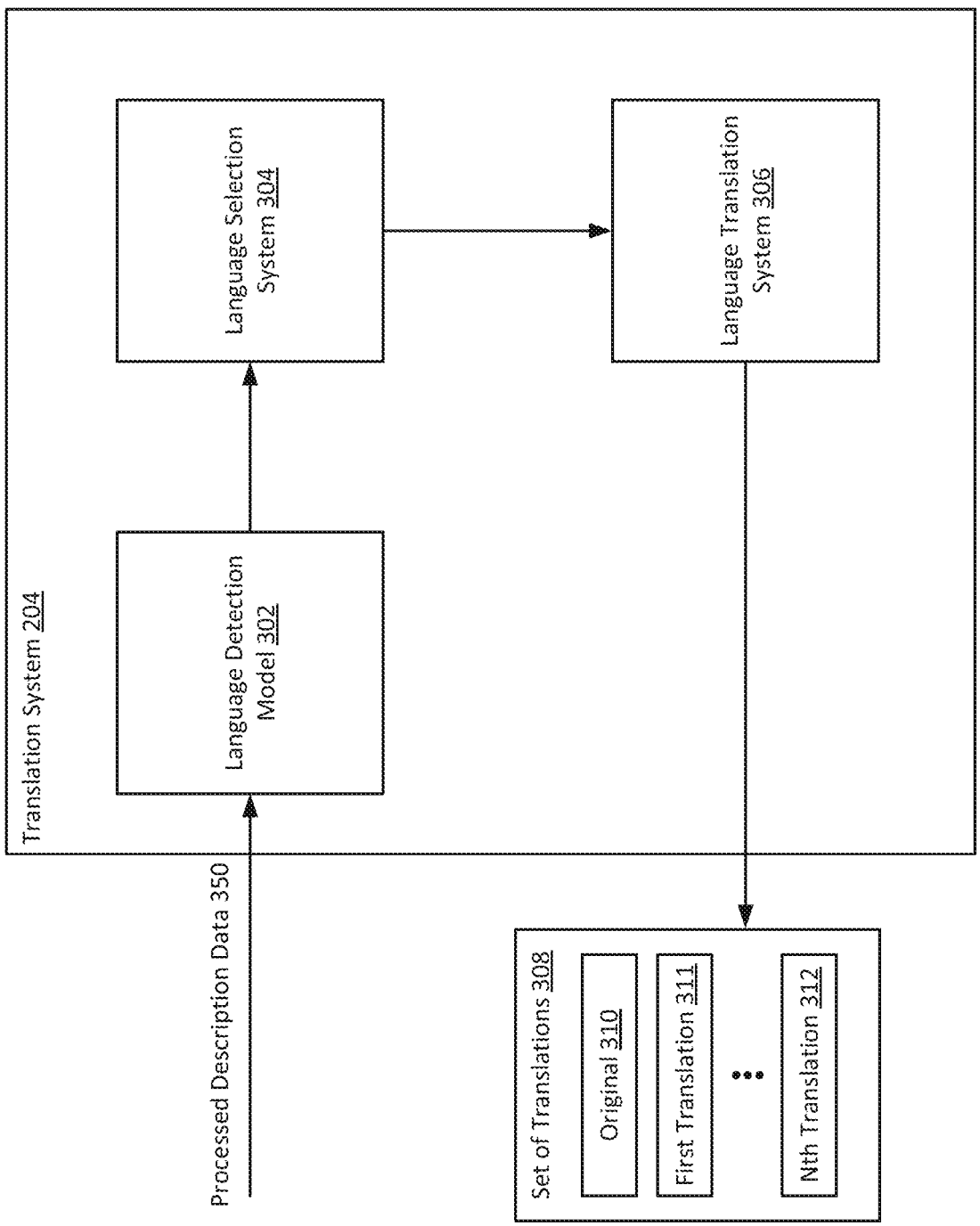
FIG. 3 illustrates an exemplary translation system according to certain embodiments.

FIG. 3 illustrates an exemplary translation system 204 according to certain embodiments. The translation system 204 includes a language detection model 302, a language selection system 304, a language translation system 306, and a set of translations 308. Translation system 204 can be part of attribute extraction system as illustrated in FIG. 2. The translation system may receive processed description data 350 and may generate a set of one or more translations 308.

Systems that rely on processing data in one language often face challenges with the need to convert regional language data into English for consistency with their analytics (e.g., previously obtained analytics, for comparison with other product data). Accurate translation is complicated by the brevity and lack of proper grammar in product descriptions, making source language identification difficult. For instance, "Carte d' or vanilla ice cream" might be misidentified as French because of the brand name, despite being an English description. Additionally, even when the source language is accurately identified, selective translation issues arise, as exemplified by "Carte d' or ice cream fraise" being incorrectly translated to "Card pain Strawberry Ice cream." These challenges hinder the effective mapping and utilization of product descriptions across different languages.

The translation system 204 can be configured to employ an Extract-Translate-Extract (ETE) technique to handle product descriptions in multiple languages. Initially, the translation system 204 can extract attributes from the original description using a QA module. The description can then be translated into English, considering the top N languages present in the input data (e.g., the preprocessed description data output by preprocessing system 202 illustrated in FIG. 2). In certain embodiments, N may be set to 2, for example, using Romance and Germanic translation models. This can ensure that attributes such as Brand and Volume, which should not be translated, are correctly identified and preserved. For instance, even when "Carte D' or" is incorrectly translated into "Card Pain," the system uses distribution-based correction to revert it back to "Carte D' or."

The translation system 204 can effectively identify and correct translation errors. For example, the original description "carte d' or ice cream fraise" results in "Carte D' or" being correctly extracted as the brand. When translated through Romance and Germanic models, the descriptions might vary, but the system ensures the final attributes are accurate. For instance, "card pain ice cream strawberry" (from Romance) does not misidentify any brands, allowing "Carte D' or" to be selected during the correction phase. Similarly, "strawberry" can be identified as the correct variant from the translated text, even if "fraise" was initially missed. This method ensures both accuracy and consistency in attribute extraction across different languages.

The process can begin with the translation system 204 receiving as input the preprocessed description output by preprocessing system 202. The preprocessed description can be input into the language detection model 302. The language detection model 302 can further processes the product descriptions to determine the probability distribution of each language present in the text. This may include identifying related languages within language families, such as Romance languages (French, Spanish, Portuguese) and Germanic languages (German, Dutch, English). By considering these language families, the module enhances the accuracy of multilingual translations. The language detection model 302 (e.g., a classification model) may also assign confidence scores to each language detected, filtering out those below a set threshold. After identifying potential languages for translation, the module can calculate the frequency of occurrence for each language among the candidates. The top N languages (e.g., Romance and Germanic), which maintain desirable data coverage, can then be selected for translation.

The language selection system 304 can then finalize the N source languages for translation, such as Romance and Germanic languages for example (where N=2). Once these N languages are identified, the system selects the appropriate translation models corresponding to these language families, with the target language being English (or another language). The product descriptions are then processed using the indicated translation models (e.g., the Romance and Germanic languages translation models) included in the language translation system 306. This results in multiple translated versions (N translated descriptions) for each original product description, ensuring comprehensive and accurate translation across different language variants. The result may be output from the language translation system 306 as the set of translations 308 which includes the original description 310 and the translation data (e.g., a first translation 311 through Nth translation 312. This multi-model approach can help in capturing the nuances and variations in product descriptions, ultimately improving the accuracy and utility of the translated data.

For example, "Carte d' or vanilla ice cream" might be detected as French because of the brand name "Carte d' or," though it is an English description. Additionally, selective translation issues arise, such as "Carte d' or ice cream fraise" being translated to "Card pain Strawberry Ice cream." To address these challenges, the ETE method can be implemented to extract key attributes from the original description, translate the description into English using the top languages detected in the input corpus (e.g., Romance and Germanic), and then re-extract the attributes. Brands and volumes can be preserved. For example, "Carte d' or" can be initially translated to "Card Pain" but corrected back to "Carte d' or" during distribution-based correction. Similarly, "fraise" can be accurately identified as "strawberry" in the translated text. The language detection module processes descriptions, assigns confidence scores, and selects top languages like Romance and Germanic for translation, ensuring comprehensive data coverage and accurate attribute extraction.

Translation system 204 can then output the N+1 descriptions (the original 310 description and the translation data for each of the translations), included in the set of translations 308. Once the set of translations 308 is generated, which consist of N translated descriptions along with the original 310 product description, the answer extraction system 206 can process the set of translations 308 descriptions to extract specific attributes (e.g., described with respect to FIGS. 2 and 4). This comprehensive translation approach ultimately enhances the reliability and completeness of the extracted data, providing a robust foundation for downstream applications and analyses.

Figure 4:
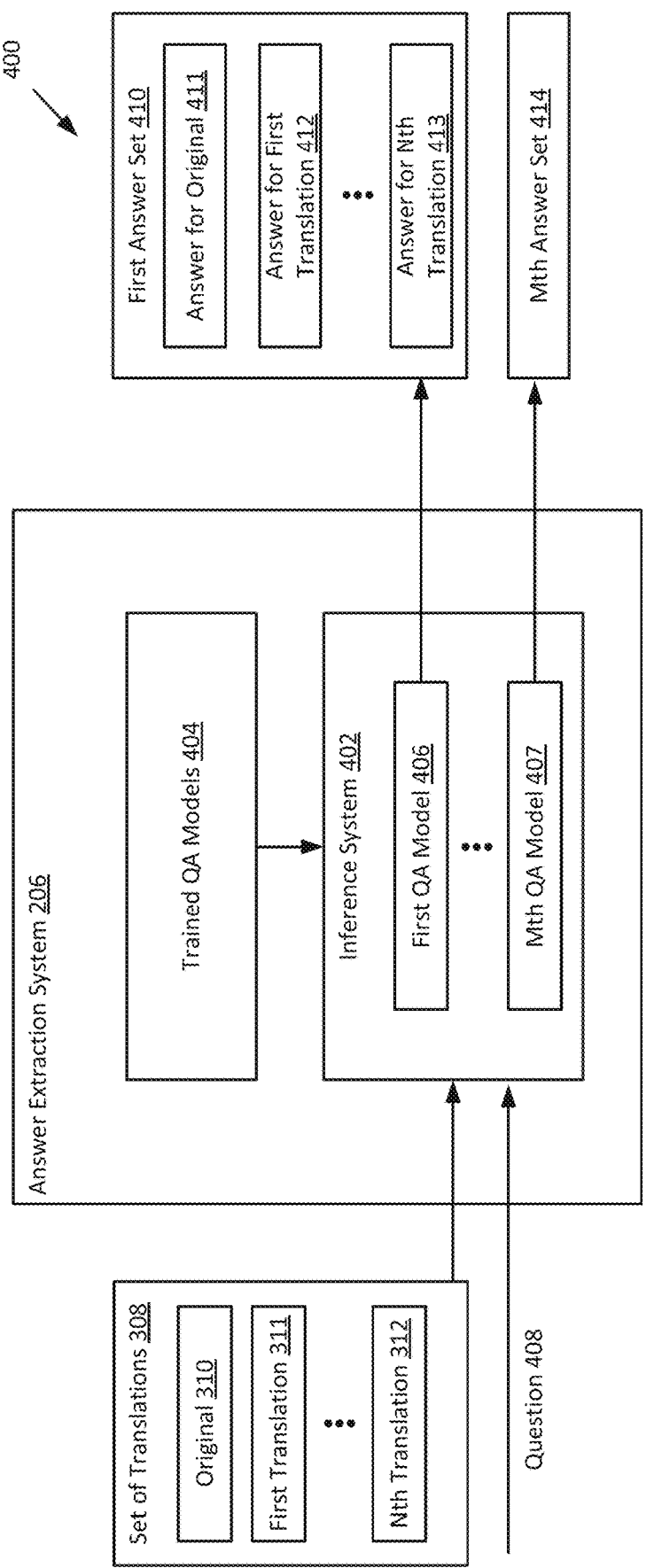
FIG. 4 illustrates an exemplary answer extraction system, according to certain embodiments.

FIG. 4 illustrates an exemplary answer extraction system 206, according to certain embodiments. The answer extraction system 206 can receive a set of translations 308 and a question 408 generate one or more answer sets, as represented by the first answer set 410 through the Mth answer set 414. The answer extraction system 206 may include one or more trained QA models 404, an inference system 402, and/or one or more QA models 406-407. Answer extraction system 206 can be part of attribute extraction system as illustrated in FIG. 2.

The answer extraction system 206 can interpret the text in each description included in the set of translations 308 to identify and isolate relevant attributes such as brand, variant, volume, and other attribute details. By running the answer extraction system 206 on both the original 310 and translated descriptions (e.g., the first translation 311 and the Nth translation 312), the system can generate an accurate extraction of attributes, accounting for any discrepancies or variations introduced during translation.

QA models, such as first QA model 406 through Nth QA model 407, can be used for attribute extraction due to their scalability and generalizability. Unlike traditional models, QA models can scale efficiently without the need for extensive additional resources, making them a cost-effective solution for large-scale deployments. Furthermore, QA models exhibit strong generalizability, meaning they can handle new attributes within the domain without requiring further fine-tuning, thereby reducing the time and effort needed for model updates. The approach of QA models involves presenting a context (text sequence) and a question, where the task is to identify the best span in the context that corresponds to the answer. In the context of attribute extraction, the product description is treated as the context, and the attribute to be extracted is framed as a question. For example, if the product description is "Carte D' or vanilla ice cream 500 ml" and the attribute to be extracted is the brand, the model would be asked, "What is the brand?" and it would identify "Carte D' or" as the answer. To achieve optimal results, an ensemble of open and closed domain QA models can be used. This ensemble approach leverages the strengths of different models to enhance accuracy and robustness in attribute extraction, ensuring that the extracted data is both comprehensive and reliable. This method not only improves the quality of the extracted attributes but also ensures that the system can adapt to a wide range of product descriptions and attributes.

Turning back to FIG. 4, a question 408 is selected and input into answer extraction system 206 along with the set of translations 308 generated by translation system 204 which consist of N translated descriptions along with the original product description. Question selection involves formulating specific questions tailored to the entity or attribute that needs to be extracted from a product description. By transforming the attribute into a question, the QA models, first QA model 406 through Nth QA model 407, in the inference system 402 can more effectively pinpoint the relevant information within the text. According to some embodiments, first QA model 406 through Nth QA model 407 may be selected from the trained QA models 404.

To extract the brand from a product description, a question like "What is the brand in the product?" is formulated. Similarly, other attributes can be targeted with specific questions such as "What is the volume of the product?" for volume, "What is the container in the product description?" for container, and "What is the variant in the product description?" for variant. These sample questions serve as a starting point, and additional questions can be formulated based on the data and attributes used and generated by the system described herein. This flexible approach allows for the creation of a comprehensive list of question-attribute pairs that can be updated and expanded to cover a wide range of attributes. It ensures that the QA models 406-407 remain effective and adaptable to various contexts and new attributes, providing precise and accurate attribute extraction across diverse product descriptions. The questions may be preconfigured and used based on the attribute(s) being extracted/analyzed from the input data.

At the answer extraction system 206, a model or set of models (e.g., first QA model 406 through Nth QA model 407) may be selected from a set of one or more trained QA models 404. Model selection for product descriptions involves leveraging trained QA models that cater to different domains. Depending on the data, models can be selected either from an existing list or new models may be trained, which is described in greater detail with reference to FIG. 4. Two primary types of Question Answering (QA) models can be utilized: Extractive and Abstractive. Extractive QA models are designed for closed domain scenarios, relying exclusively on the given product description to extract answers, meaning that the generated answers will be substrings from the provided context. In contrast, Abstractive models operate in an open domain and utilize all data available during their training to generate the best possible answers. These models can identify attribute values even from data containing product descriptions written in acronyms or with vowels removed, such as interpreting "Grpfrt" as "Grapefruit." Extractive models tend to perform better with pristine product descriptions. The decision to use either or both model types in the solution pipeline may be determined by the specific characteristics of the data at hand (e.g., whether data and attributes included in a given product description should be used to determine an answer (e.g., closed domain scenario) and/or whether other data previously trained on should also be considered (e.g., abstractive scenario).

The selected question 408 (e.g., from a question database) is passed to the answer extraction system 206 along with the product description as the context. The questions included in the question database may be configured to be used with one or more of the trained QA models 404 and/or to obtain one or more answer(s). For each product description, there may be (N+1)*M candidate answers, where N represents the number of translations included in the set of translations 308 (e.g., from translation system 204) and M represents the number of models used in the inference system 402. This results in "(N+1) M" candidate answers for each attribute from a single product description included in input data (e.g., input data 150). For example, if there are 2 models (M=2) and 2 translations (N=2), this results in 6 candidate answers per product description for each attribute. The candidate answers for a translation included in the set of translations 308 (e.g., the original 310) can be output by the answer extraction system 206 as answer for original 411 included in the first answer set 410. For each model, an answer is output for each translation based on the question. Thus, the answer sets, such as first answer set 410 through Mth answer set 414, include a subset of answers for each model based on the input, such as answer for original 411 and answer for first translation 412 through answer for Nth translation 413. The QA models included in the inference system 402 may then be used with the original 310 through the Nth translation 312 included in the set of translations 308 to generate an answer set (e.g., Mth answer set) for a second question.

This process, referred to as Extract-Translate-Extract (ETE), involves translating the entire product descriptions rather than specific words. The ETE method extracts answers from different versions of the original product descriptions, enabling the generation of multiple candidate answers through translation. This broadens the range of options, as multiple translations and models can capture different nuances and variations in the product descriptions. This comprehensive approach enhances the likelihood of accurately identifying the correct attribute values.

Figure 5:
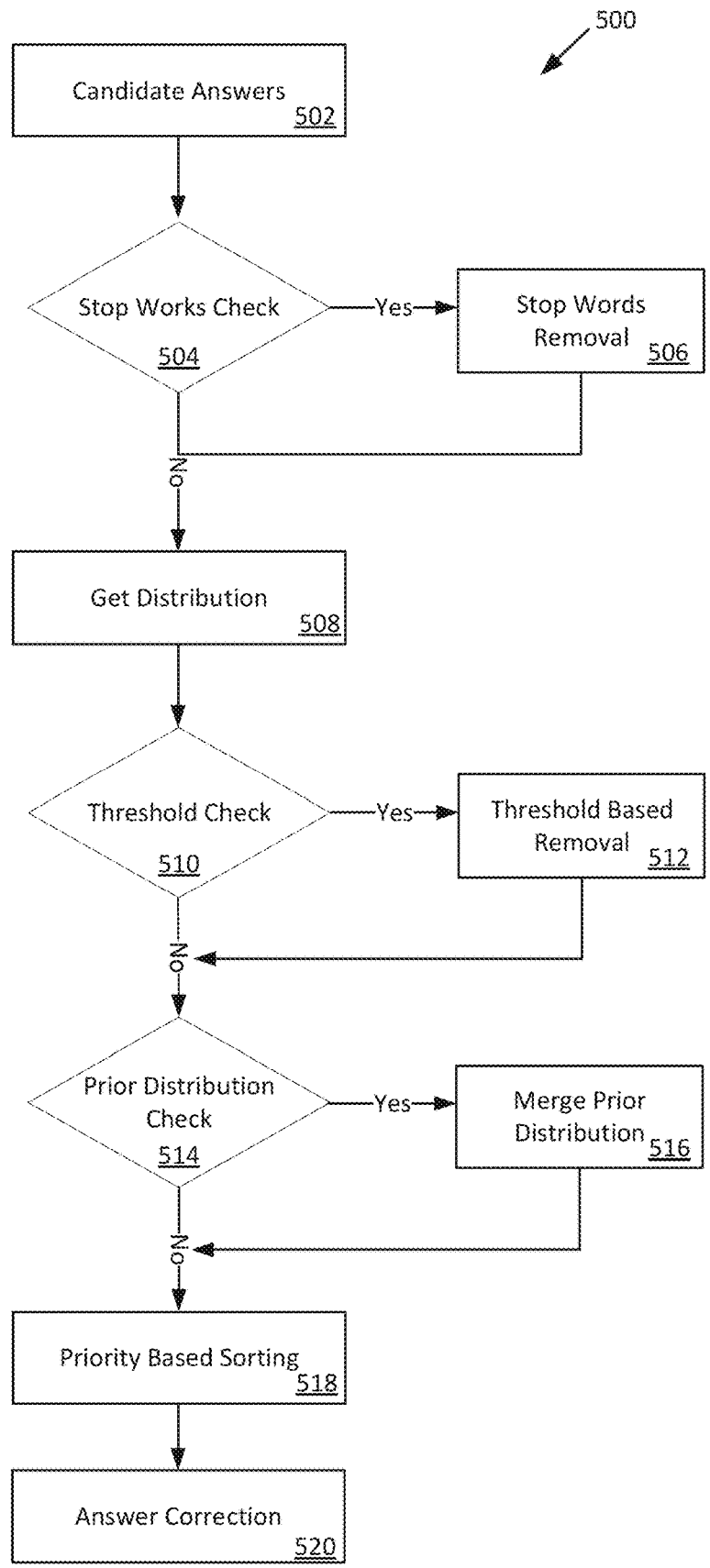
FIG. 5 illustrates an example distribution based correction flow to correct the answers output by an answer extraction system, according to certain embodiments.

FIG. 5 illustrates an example distribution based correction flow 500 to correct the answers output by an answer extraction system, according to some embodiments. The answers may be, for example, the answers output by the answer extraction 206. Some examples may include more steps, fewer steps, different steps, or a different combination of steps than the steps shown in FIG. 5. The steps of FIG. 5 are described with reference to the distribution based correction system 208 illustrated in FIG. 2.

Distribution-based correction can be used to enhance the accuracy of answers extracted by Question-Answer (QA) models (QA models included in inference system 402), particularly when these models sometimes extract incorrect answers with high confidence. This method improves accuracy by analyzing how often each answer appears across the entire dataset (e.g., first answer set 410). Answers that are extracted more frequently are deemed more likely to be correct and are thus prioritized for the final answer selection. For instance, in a dataset containing brands like Coca Cola, Pepsi, and Fanta, these frequently occurring brands are more likely to be chosen as the correct answer for the brand attribute over less common ones. This method is applied multiple times at various levels of aggregation to ensure robustness. In this way, even if the QA models occasionally provide incorrect answers with high confidence, the distribution-based correction acts as a secondary filter, ensuring that the most common and likely correct answers prevail. This method can be particularly useful in scenarios where certain attributes, like brand names, are consistently repeated in the data, allowing the system to make more informed and accurate decisions based on the overall data distribution.

At step 502, the process may begin by running the QA models on the product descriptions to generate multiple candidate answers (e.g., first answer set 410). These answers can then be analyzed for their frequency of occurrence across the dataset. The distribution-based correction algorithm can identify the most frequently extracted answers and select them as the final answers. The identification of candidate answers can be done for each attribute separately. This approach leverages the inherent redundancy and commonality in large datasets to filter out less probable answers.

At step 504, a check can be performed to see if a stop words list is provided. If so, at step 506 stop words from the stop words list can be removed from the distribution table to eliminate common, non-informative terms.

At step 508, the correction system can calculate various priority indicators, such as frequency, token length, ensemble sorting, and model answer confidence, to create a distribution of the candidate answers. A frequency can be the frequency of the candidate answers. A token length can be the number of tokens present in candidate answers. A model answer confidence can be the average confidence of candidate answers. Ensemble sorting can be sorting candidate answers in a hierarchical manner based on selected indicators, using a secondary indicator in case of ties.

Once the distribution is established, at step 510, a threshold check may be performed to filter out candidate answers that do not meet the specified threshold. A threshold can be set based on the selected priority indicator once the distribution table is created. Any candidate answer having the priority-indicator value more (or less depending on the selected priority indicator) than the threshold will be considered a valid candidate answer for the update. If no threshold is explicitly provided, the data may be analyzed in auto mode, where the threshold is calculated automatically. In auto mode, for priority indicators where values below the threshold are to be discarded, the threshold can be set by subtracting 1.5 times the interquartile range from the first quartile. Conversely, for priority indicators where values above the threshold are to be discarded, the threshold can be set by adding 1.5 times the interquartile range to the third quartile. Alternatively, if no threshold is given, this step may be skipped.

At step 512, based on the threshold given, candidate answers with priority indicator values less than the threshold may be removed.

At step 514, a check can be performed to determine if prior distribution of attributes is available.

At step 516, if a prior distribution of attribute values is available, it can be merged with the current distribution to leverage historical data and enhance the quality of candidate answers. The two distributions are merged by combining the priority indicator values of candidate answers using methods such as summing frequencies, retaining token lengths, calculating weighted averages of model confidence, and aggregating ensemble sorting indicators.

At step 518, the combined distribution may then be sorted based on the chosen priority indicator. For example, if frequency is the priority indicator, answers that appear more frequently will be given higher priority. This sorting process establishes a clear order among the candidate answers, ensuring that the most likely correct answers are prioritized.

At step 520, the system can iterate through the sorted distribution table to update the answers in the product descriptions. If a candidate answer matches or aligns with the information in the original product description, it is selected as the final answer. This process is repeated at multiple levels, including within translation model correction, cross-translation within model correction, and cross-model correction. This multi-level approach ensures that the chosen answers are accurate and consistent with the original product descriptions, even in cases where the initial QA models may have extracted incorrect answers with high confidence. Blank answers can also be given if none of the candidate answers fit the product description, indicating insufficient confidence or relevant information. The distribution-based correction thus acts as a secondary filter, leveraging data redundancy to improve overall accuracy.

Distribution-based correction can be performed at multiple levels to reach the final answers (e.g., within translation model correction 610, cross translation within model correction 620, and cross model correction 630). The difference between these levels lies in the source data used for corrections, ensuring comprehensive and accurate attribute extraction across diverse product descriptions.

Figure 6:
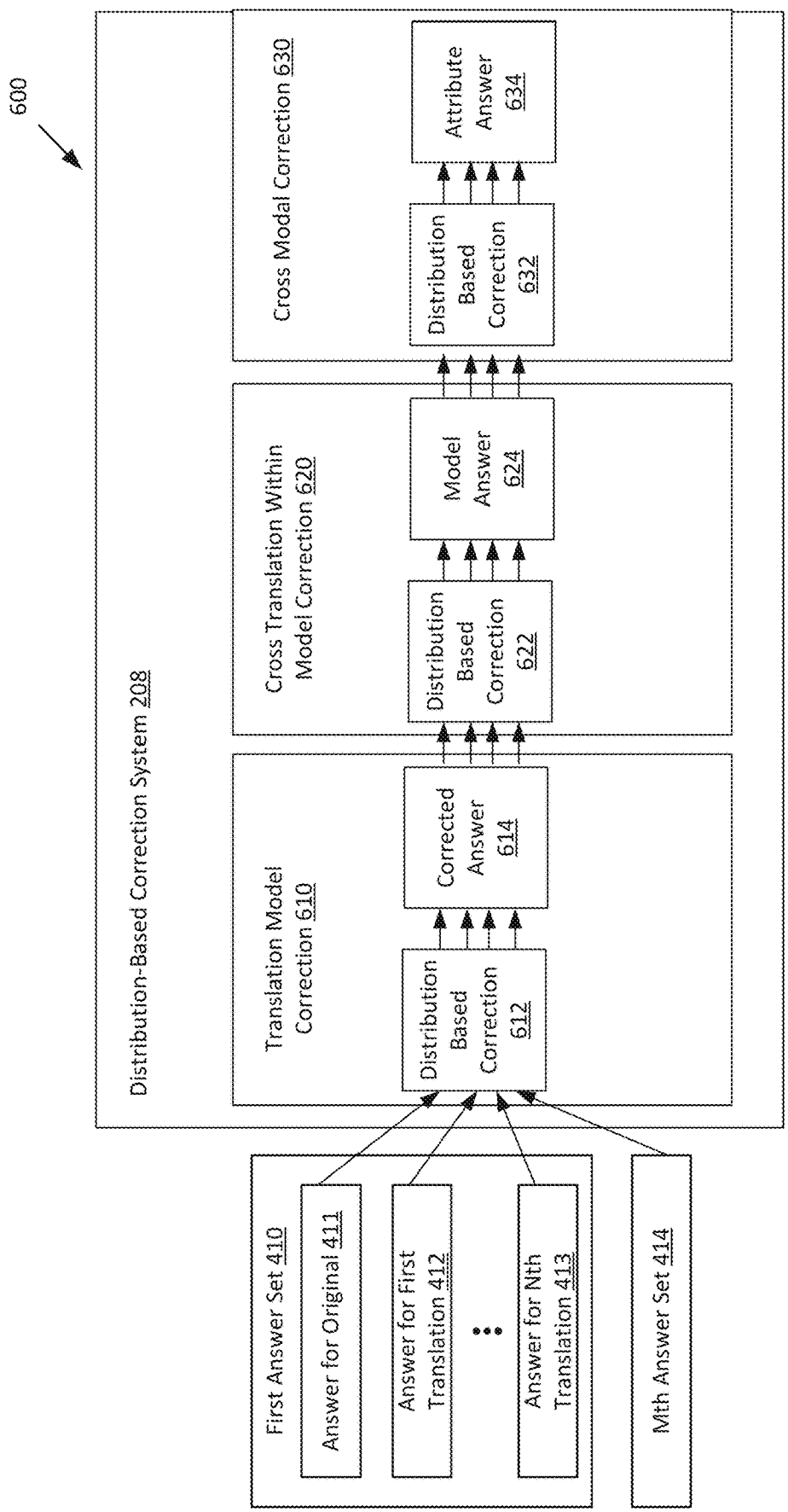
FIG. 6 illustrates an exemplary distribution-based correction system, according to certain embodiments.

FIG. 6 illustrates an exemplary distribution-based correction system 208, according to certain embodiments. Illustrated in FIG. 6 is distribution-based correction system 208, answer sets (first answer set 410 through Mth answer set 414), translation model correction 610, distribution based correction 612, corrected answer 614, cross translation within model correction 620, distribution based correction 622, model answer 624, cross modal correction 630, distribution based correction 632, and attribute answer 634. The system 208 can be the distribution based correction system 208 of FIG. 2.

According to some embodiments, the distribution-based correction system 208 can receive, as input, answer sets (e.g., first answer set 410, Mth answer set 414). The distribution-based correction system 208 can be used for each answer individually. Each answer in the answer sets can be input into translation model correction 610. Within translation model correction 610 there can be a process designed to refine the extracted answers from answer sets by analyzing their distribution within a single translation model. Initially, answer sets can be obtained from the original, non-translated product description using a specific QA model (referred to as Original Answer 1). These answers can serve as the initial set of candidate answers. The distribution of these candidate answers can then be calculated by the distribution based correction 612, which involves determining how frequently each answer appears in the dataset. If prior distributions from previous runs or similar datasets are available, they can be merged with the current distribution to leverage historical data and improve accuracy. The combined distribution can be sorted based on a priority indicator, such as frequency, token length, or model confidence, to establish a hierarchy among the candidate answers. Finally, the correction can be performed by iterating through the sorted distribution list and updating the extracted answers in the product descriptions to output a corrected answer 614 for each input answer from answer set (e.g., first answer set 410, Mth answer set 414). This ensures that the final attribute values are accurate and consistent with the original descriptions, thereby enhancing the reliability of the extracted data within the context of a single translation model.

At the cross translation within model correction 620, the corrected answer 614 can be refined by considering the distribution of candidate answers across multiple translations within the same model. This step is undertaken after the initial level of distribution-based correction has been completed. The corrected answers 614 obtained from both the original (non-translated) product description and its various translated versions using the same QA model can be used as inputs. These candidate answers can then be subjected to another round of distribution-based correction 622. By analyzing how frequently each candidate answer appears across both the original and translated descriptions, the system can identify the most likely correct answer and outputting the model answer 624. This iterative correction process can ensure that the final answer from a single model is both accurate and consistent, effectively leveraging the combined insights from multiple translations of the product description.

The cross modal correction 630 is aimed at refining and confirming the extracted answers, model answers 624, to ensure they are as accurate as possible. In this phase, all the model answers 624 obtained from the cross translation within model correction 620 can be utilized. The model answers 624, which may have already been refined by considering the distribution of candidate answers across multiple translations within the same model, can serve as the input for the cross modal correction 630. The process involves performing another iteration of distribution-based correction 632 across these model answers 624 from different models. By analyzing the frequency and other priority indicators of these candidate answers across all models, the system can identify the most likely correct answer, the attribute answer 634. This comprehensive approach leverages the collective insights from multiple models and translations, culminating in the selection of a single, attribute answer 634 that is both accurate and consistent with the original product description.

To illustrate how distribution-based correction works, consider a set of product descriptions in various languages: "san benedetto eau 1.5 1 plate," "jus multifruit 6×20 cl nat bio," "vichy 1.15 1×6 st yore," and "san pellegrino limone e menta." To facilitate accurate attribute extraction, translations can be performed from two language families to English: Romance (which includes languages like French, Spanish, and Italian) and Germanic (which includes languages like German, Dutch, and English). Continuing the example the translation process can employ two types of Question-Answer (QA) models: an Abstractive Model (Pegasus QA) and an Extractive Model (DeBERTa QA). The Abstractive Model, Pegasus QA, generates answers based on all the data available during its training, making it suitable for interpreting acronyms or incomplete words. The question in this example can be "What is the brand present in the product description?" The Extractive Model, DeBERTa QA, operates by extracting answers directly from the provided context, ideal for more straightforward, pristine product descriptions. By leveraging these two models and translating the descriptions from multiple language families, the system aims to accurately identify and extract attributes such as brand, volume, and variant from the product descriptions, ensuring comprehensive and reliable data processing.

By utilizing translated distributions alongside original descriptions (particularly for non-English descriptions) and employing multiple QA models, the system can generate multiple candidate answers for attributes across input data. Performing distribution-based corrections at multiple levels yields better results compared to conducting the corrections in a single, consolidated step. This multi-level approach allows for iterative refinement and validation of candidate answers, enhancing the accuracy and reliability of the final extracted attributes.

Figure 7:
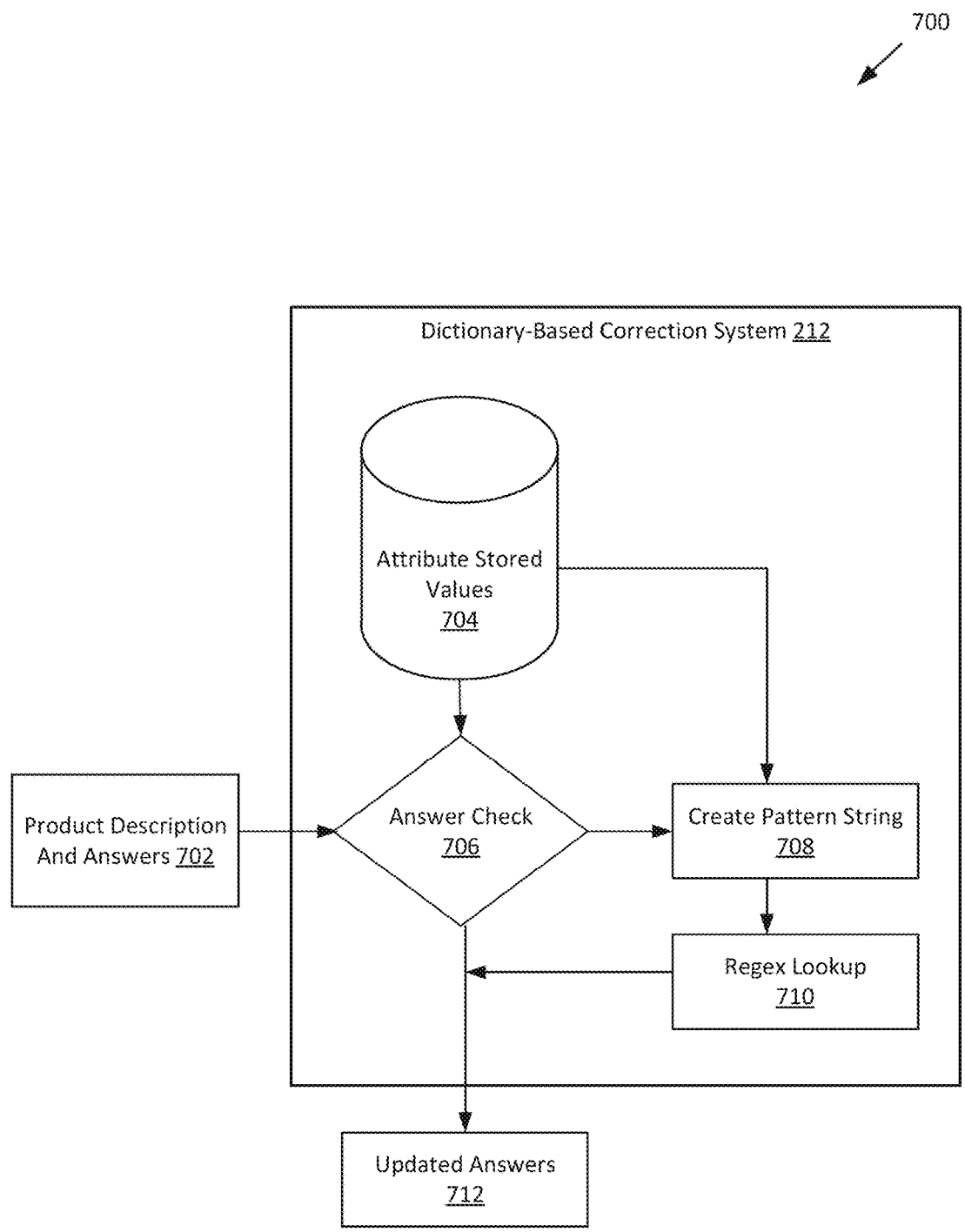
FIG. 7 illustrates an exemplary dictionary based correction system, according to certain embodiments.

FIG. 7 illustrates an exemplary dictionary based correction system 212, according to certain embodiments. Illustrated in FIG. 7 is a dictionary-based correction system 212, product description and answers 702, attribute stored values 704, answer check 706, create pattern string 708, regex lookup 710, and updated answers 712. The dictionary based correction system 212 can be the dictionary-based correction system 212 of FIG. 2.

According to some embodiments, dictionary-based correction system 212 may be used after a distribution-based correction system (e.g., distribution based correction system 208) for attributes that have bounded values, such as a container or a packaging type. Depending on the attribute, stored attribute values can be used to correct the answers. The product description and answers 702 which includes both the original cleaned product description and the answers obtained from distribution-based correction can be input into the dictionary-based correction system 212. This dual-input approach can enable the corrections to be comprehensive and consider all available data.

Certain attributes, like "Container," which have fewer dynamic values such as "Can," "Pet," or "Bottle," are unlikely to have new values emerge frequently. These static attribute values can be stored in a attribute stored values 704 database to facilitate the correction of extracted attribute values. This attribute stored values 704 database acts as a reference for ensuring that the attribute values are consistent and accurate.

At the answer check 706 component of the system, a verification step can be performed to check if all the unique answers are already encompassed within the stored attribute values. If the answer for a product description does not match any value in the stored list, those records may be directed to the regex matching step, at regress lookup 710. This ensures that only those descriptions needing further refinement are flagged for additional processing.

At the create pattern string 708 component of the system, a pattern string for regex lookup 710 can be created by sorting the attribute values based on their character length. Values with the highest character length can be prioritized and placed at the beginning of the pattern string. This ordering can be important because, during regex lookup, substrings that appear earlier in the pattern string are given preference. As a result, when multiple matches are possible, the longest match may be selected, enhancing the accuracy of the match.

During the regex lookup 710 component of the system, each product description can be iterated through, and the presence of the stored attribute values can be searched for. If any of the stored values are detected in the product description, they may be used as the updated answer. This step is pivotal in extracting the relevant attribute values from the product descriptions, ensuring that any overlooked values are accurately captured.

The attribute values in the product descriptions can then be updated using the stored values resulting in updated answers 712. This ensures that the product descriptions are aligned with the predefined attribute values, providing a consistent and reliable dataset. This iterative process of verification, pattern matching, and correction can enable high accuracy in the final attribute values, making the data robust for further analysis and application.

Figure 8:
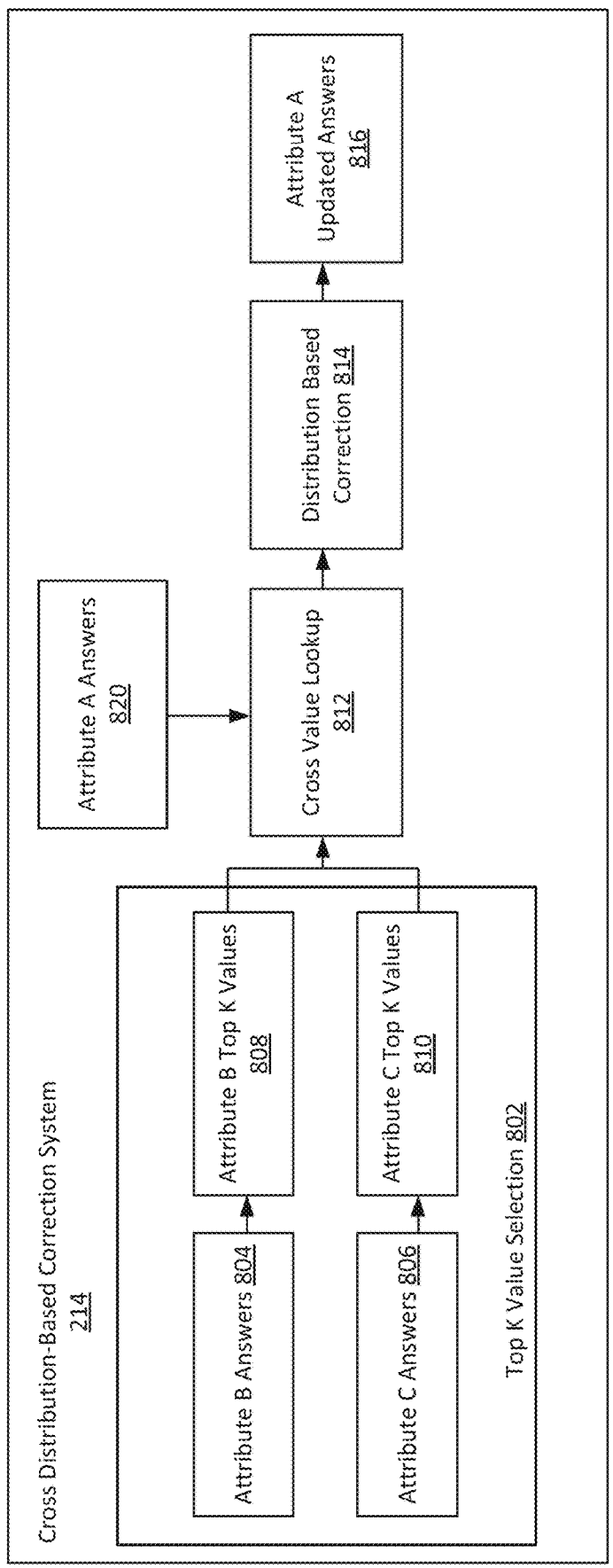
FIG. 8 illustrates an exemplary cross distribution-based correction system, according to certain embodiments.

FIG. 8 illustrates an exemplary cross distribution-based correction system 214, according to certain embodiments. Illustrated in FIG. 8 is attribute A answers 820, top K value selection 802, attribute B answers 804, attribute C answers 806, attribute B top K values 808, attribute C top K values 810, cross value lookup 812, and distribution based correction 814. The cross distribution-based correction system 214 may be the cross distribution-based correction system 214 of FIG. 2.

In cross distribution correction system 214, the values of an attribute can be corrected using the distribution of answers from other attributes. After obtaining the answers for all the attributes from answer correction module, the frequency distribution of these answers may be calculated for each attribute. For each attribute, the top K values can be collected based on their frequency of occurrence in other attributes, and a lookup can be performed. If these values are found to be present in the attribute being processed, those answers can be removed from the attribute. This process helps to refine and improve the consistency and coherence of the attribute values by aligning them with the distributions observed in other attributes. By removing the overlapping or conflicting answers, the overall accuracy and reliability of the final attribute values in enhanced. For instance, if the brand is incorrectly extracted as "pet," which is associated with the "Container" attribute, cross-distribution correction can help identify this association. Recognizing that "pet" is commonly related to the "Container" attribute rather than the brand attribute, the extracted brand value can be updated to the next potential candidate answer.

To illustrate, during cross distribution correction for attribute A, the answers for Attribute A can be compared with the top K answers of attribute B and C, removing matches and replacing them with the next more optimal answer using distribution based correction. This process can help improve the accuracy and coherence of the answers for attribute A. By considering the answers from related attributes B and C, the values of attribute A can be refined and aligned with overall distribution patterns observed in the dataset.

Turning back to FIG. 8, the process of performing cross distribution correction for an attribute, such as attribute A, involves several detailed steps to ensure the accuracy and consistency of the extracted values across different attributes. The attribute A answers 820 whose values can be checked against the top K values of other attributes can be selected. The values for attribute A answers 820 can be gathered and prepared for cross-checking. The frequency distribution of values for other attributes (Attributes B and C answers 804, 806) can be calculated using the data received from the one or more answer correction models. The top K value selection 802 can be selected. The value of "k" can vary for different attributes depending on their specific requirements or characteristics (Attribute B and C top K values 808, 810).

At the cross value lookup 812 step, each answer from attribute A answer 820 may be searched within the top K answers the frequency distributions of attributes B and C. If any answer from attribute A is found among the top K answers for attributes B and C, it can be removed from the list of attribute A answers. This cross-checking ensures that the values of attribute A are unique and not overlapping with the top values of other attributes.

After removing the overlapping answers through the cross value lookup 812, there may be empty spaces or gaps in the list of attribute A answers 820. To fill these gaps, another round of distribution-based correction 814 can be performed using the remaining attribute values available for attribute A.

This step involves recalculating the distribution and selecting the next most optimal answers to replace the removed ones.

The final step involves updating the answers for attribute A after the distribution-based correction is performed. The attribute A updated answers 816 are those that are not present in the top K values from the remaining attributes, ensuring that attribute A has a unique and accurate set of values. This iterative process of checking, removing, and correcting can further enable the final values for attribute A are robust and reliable, reducing redundancy and enhancing data quality across multiple attributes.

Figure 9:
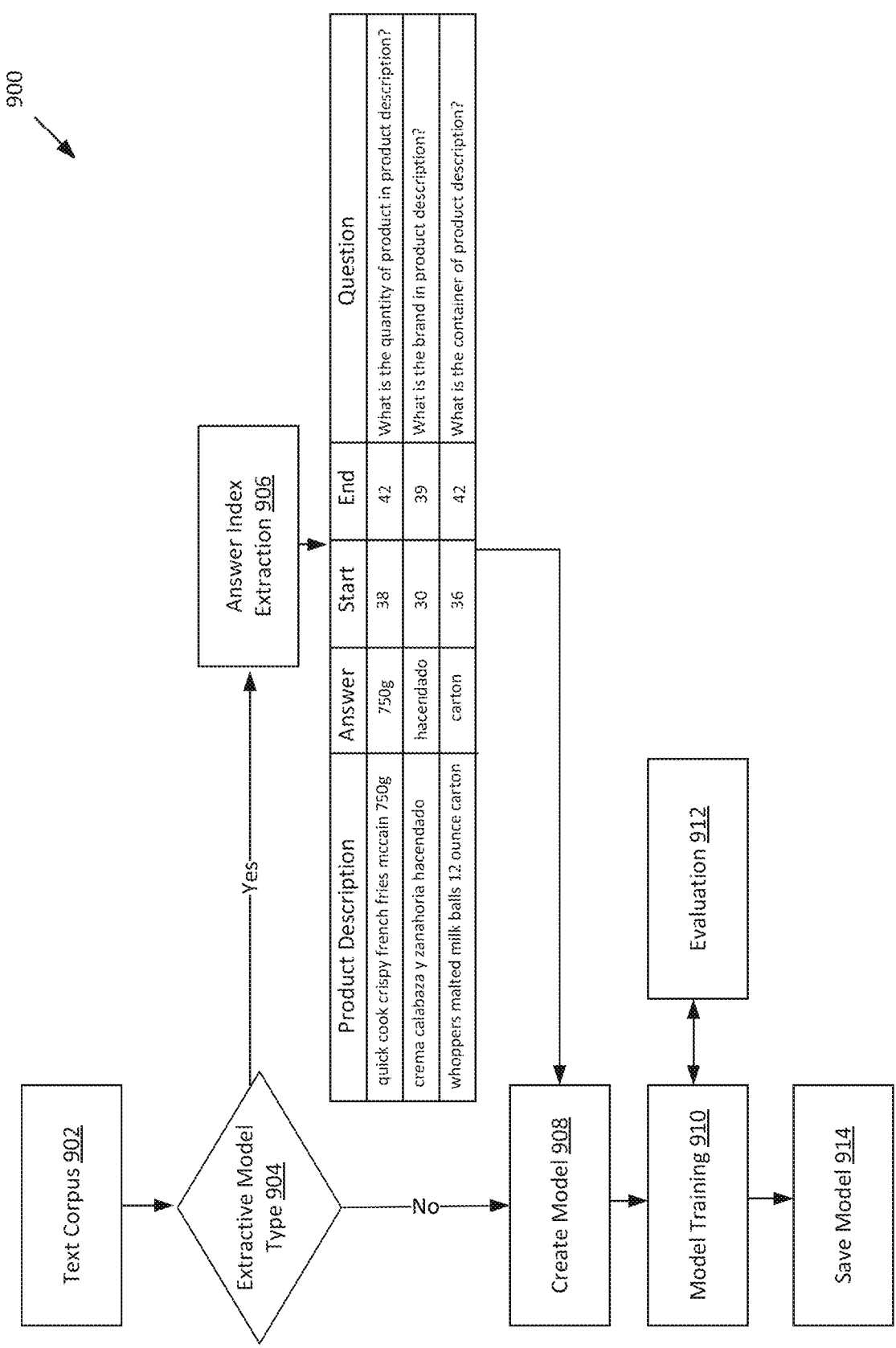
FIG. 9 illustrates a flow for training a model used for answer extraction, according to certain embodiments.

FIG. 9 illustrates a flow 900 for training a model used for answer extraction (e.g., used by answer extraction system 206), according to some embodiments. Some examples may include more steps, fewer steps, different steps, or a different combination of steps than the steps shown in FIG. 9.

At step 902, the text corpus can be gathered, which includes product descriptions along with their respective attributes such as brand, size, pack count, etc. The model can then be trained to predict these attributes based on the product descriptions. Fine-tuning the model on a specific type of dataset ensures that it can perform well on similar, unseen datasets in the future.

At step 904, depending on the type of model being used the data preparation can vary. The example illustrated in FIG. 9 uses an extractive model type. Extractive models require the start and end positions of the answer within the input text for training, as they extract answers directly from the given context. Abstractive models, on the other hand, generate answers that may not be direct substrings of the input text and thus do not require start or end indices. For Extractive models, the start and end indices of each attribute in the data are extracted. At step 906, each character in the text may be indexed sequentially starting from 0, allowing the model to learn the exact position of the attributes within the product descriptions.

At step 908, the model instance can be loaded along with its pretrained weights. These weights are the parameters of the model that have been pre-trained on a relevant dataset, providing a starting point for further fine-tuning.

At step 910, the model can then be trained for a specified number of epochs (N). During training, the data can be divided into chunks called batches, and each pass of the entire dataset is referred to as an epoch. The model can be trained by repeatedly passing the data through it, adjusting the weights based on the errors observed. Training can continue until the model's performance stops improving or starts to degrade.

At step 912, after training, the model's performance can be evaluated at the end of each epoch using unseen data. Step 912 involves testing the model to determine which version performs the best. The evaluation helps in selecting the most effective model version for deployment.

At step 914, once the best-performing model version is identified, it can be saved for production deployment in an inference system. This final model is expected to perform well on datasets similar to the ones it was trained on, ensuring reliable and accurate attribute extraction in practical applications.

In situations where the information related to an attribute in a product description is partially present but extractable, there might be instances where multiple versions of a single value exist due to missing information. For Example, "7 up" and "Seven Up" are same brand similarly "Ben and Jerry" and "Ben Jerry" are same brands, but since they are represented in different fashion thus, they are counted as different values. In scenarios like this, where the same entity can be expressed in multiple ways, it becomes crucial to address these variations during the correction process. To address this, a decision tree model can be trained to determine the similarity between two answer values.

Figure 10:
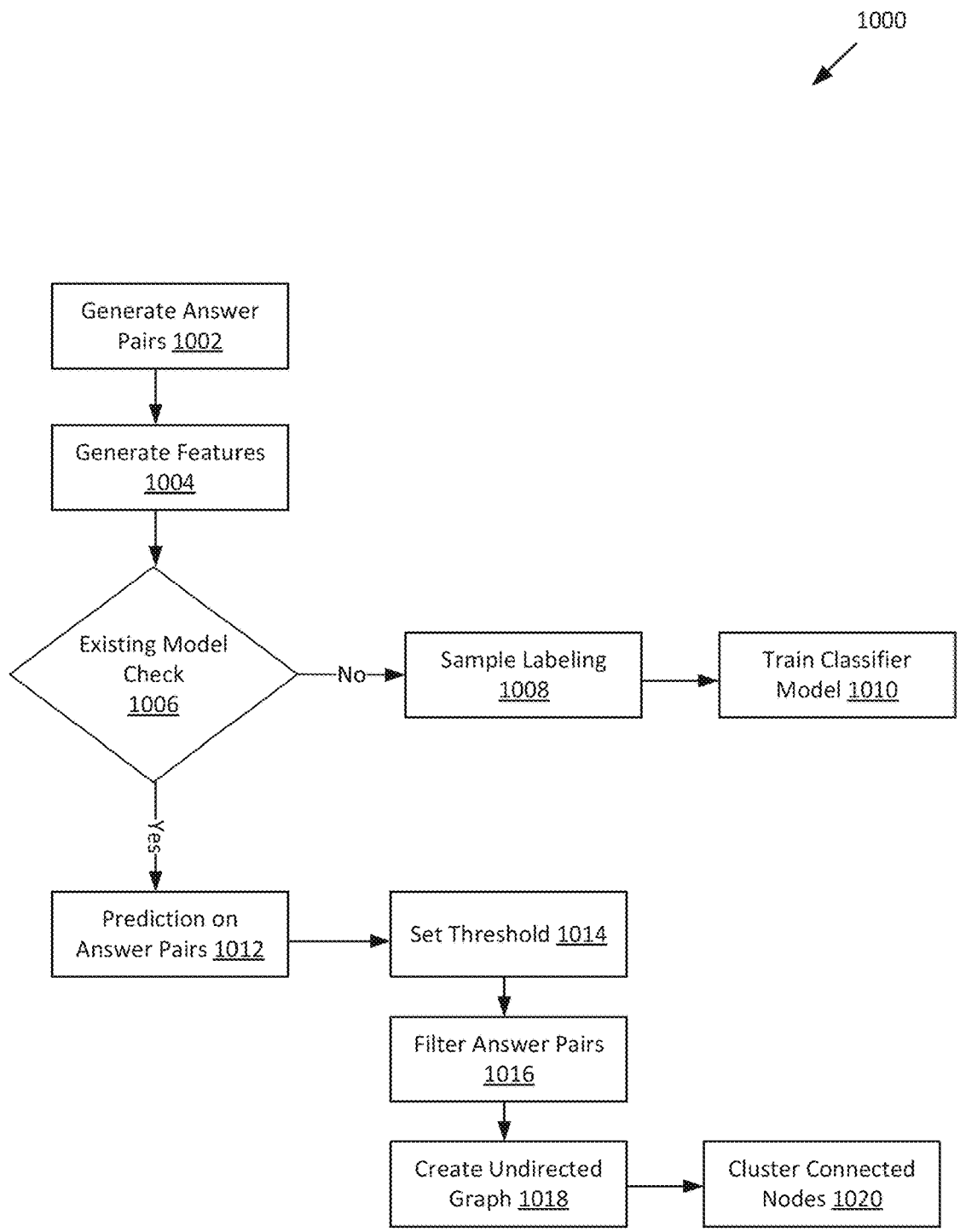
FIG. 10 illustrates an example process of non-numeric attribute harmonization, according to certain embodiments.

FIG. 10 illustrates an example process 1000 of non-numeric attribute harmonization, according to some embodiments. Some examples may include more steps, fewer steps, different steps, or a different combination of steps than the steps shown in FIG. 10. The process of identifying and consolidating similar attribute values can involve several detailed steps, leveraging features like cosine similarity and longest common substring (LCS) match ratio.

The process 1000 can involve training a Decision Tree model to determine the similarity between answer values. At step 1002, answer pairs can be generated. If p unique answers were extracted for an attribute, then p pairs may be generated. For example, three brands are extracted: "7 up," "Seven up," and "Fanta." Then three pairs can be created and the model can be trained to predict if the pair represent the same value, in this case "7 up" and "Seven up" will be counted as same value. The decision tree model may be included in the attribute harmonization system 104.

At step 1004, features may be generated. Cosine similarity and longest common substring (LCS) match ratio may be used as features to train the Decision Tree model. The cosine similarity can be generated by using transformer-based models to calculate the cosine similarity between pairs of extracted answers. This measure can be used to quantify the similarity between the semantic representations of the answers, providing a robust metric to compare the pairs. The LCS match ratio can be calculated for each pair. This ratio can be determined by dividing the length of the longest common substring by the length of the longer answer in the pair. This measure can provide for an additional perspective on the degree of overlap between the answers.

At step 1006, a check can be performed to determine if a new classifier model needs to be trained or if a suitable model already exists. If a suitable model already exists, it is loaded for use. Otherwise, the process proceeds to sample labeling.

At step 1008, for training the classifier model, a small fraction (e.g., 1%) of the total answer pairs can be selected for labeling, or sample labeling. This involves assigning a similarity label (e.g., similar or dissimilar) to each pair based on their actual similarity.

At step 1010, the classifier model can be trained using the labeled dataset, with cosine similarity and LCS match ratio as features. These features effectively capture the similarities between answer pairs, allowing the model to learn to distinguish between similar and dissimilar pairs.

At step 1012, once trained, the classifier model can be applied to all possible answer pairs, generating predictions and confidence scores for each pair. These pairs represent answers that are likely to convey the same information.

At step 1014, a threshold for the prediction confidence can be set. This threshold determines the minimum confidence required for two answers to be considered similar.

At step 1016, the answer pairs can be filtered based on the set threshold. Pairs with confidence scores below the threshold are discarded, ensuring that only pairs with high similarity are retained.

At step 1018, an undirected graph can be created using the filtered answer pairs. In this graph, each answer can be represented as a node, and the pairs can connect nodes that are predicted to be similar. This graph structure helps establish connections between related answers.

At step 1020, the nodes in the undirected graph can be clustered based on the connected components. Nodes that are connected can represent answers that share the same information. This clustering process groups all transitive answers considered similar.

By following this approach, utilizing cosine similarity and LCS match ratio as features in a Decision Tree model, the system effectively predicts the similarity between answers, gathers similar answer pairs, forms a connected graph, and clusters the connected nodes. This method helps consolidate and refine the extracted attribute values, allowing for the replacement of similar variations with a single, consistent representation.

Figure 11:
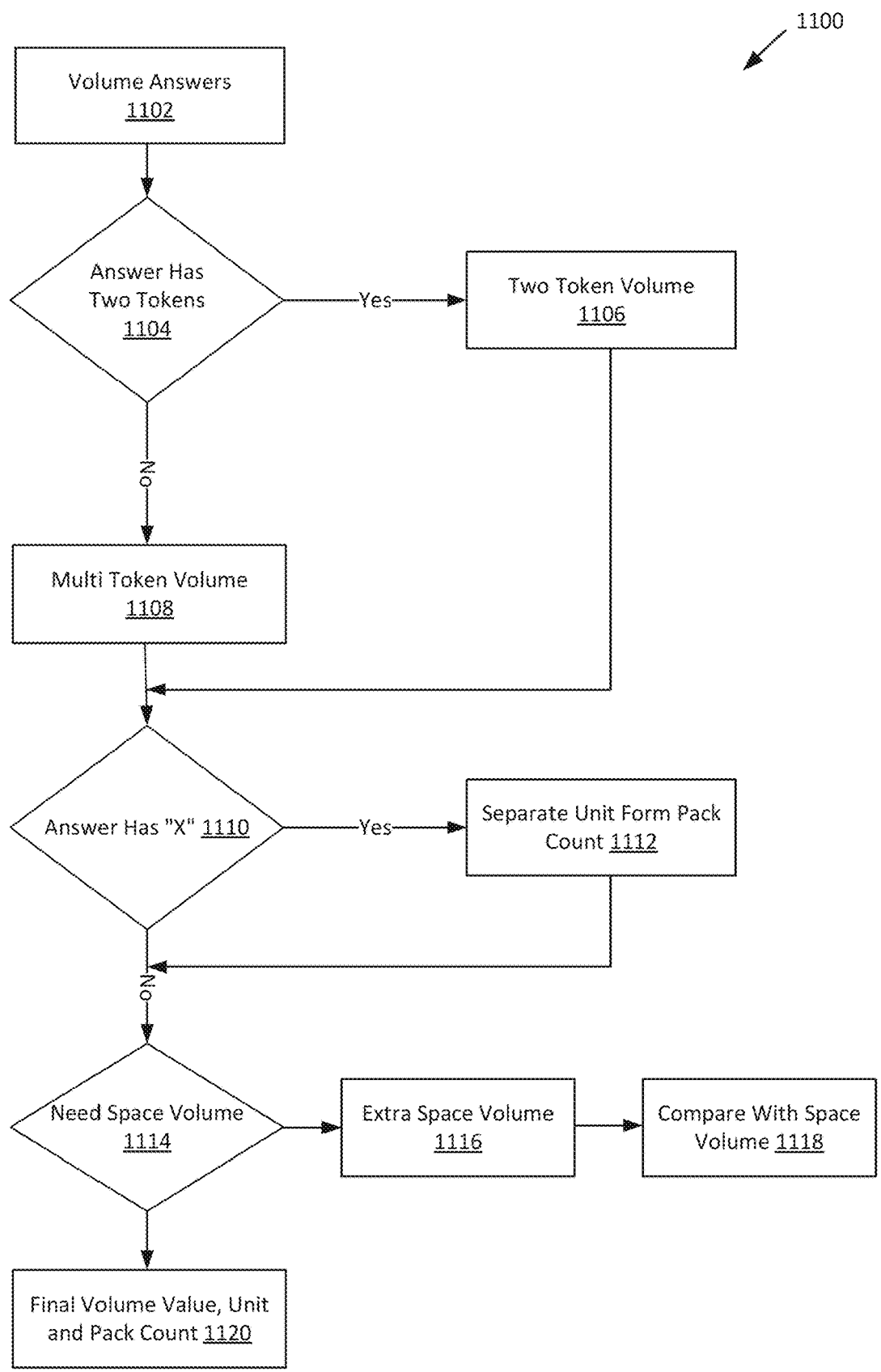
FIG. 11 illustrates an example process of numeric attribute harmonization, according to certain embodiments.

FIG. 11 illustrates an example process 1100 of numeric attribute harmonization, according to some embodiments. Some examples may include more steps, fewer steps, different steps, or a different combination of steps than the steps shown in FIG. 11. The process 1100 may be performed by attribute harmonization system 104. Numeric attribute harmonization can be useful because volume information for a product can be specified in various formats and the answers received from the question answering models usually contain all the information related to volume (e.g., a pack count, a volume value, a volume unit). For example, "SAN BENEDETTO EAU 6×1 5L PLATE", "SAN BENEDETTO EAU 1 5L PLATE×6", "SAN BENEDETTO EAU 6×1,5L PLATE", "SAN BENEDETTO EAU 1 5L×6 PLATE" etc., all these product descriptions represent same product having "1.5 L" as volume and "6" pack count, thus normalizing the volume information is important for further tasks using the solution. Using the example "SAN BENEDETTO EAU 6×1 5L PLATE," an answer from distribution-based correction will give us "6×1 5L." In post processing this information can be divided to "1.5" as volume value, "L" as volume unit and "6" as pack count.

The process of extracting and refining volume answers from product descriptions can begin at step 1102. At step 1102, volume answers can be initially obtained from distribution-based correction. These answers can contain all the information about the volume given in the product description. For instance, if the product description is "SAN BENEDETTO EAU 6×1 5L PLATE," the corrected answer might be "6×1 5L." In post-processing, this information is divided into smaller parts: "1.5" as the volume value, "L" as the volume unit, and "6" as the pack count.

At step 1104, the number of tokens present in the answer obtain from distribution-based correction can be checked. If the answer contains more than two tokens, it can be handled differently compared to answers with only two tokens.

At step 1106, if there are two-token volume answers, for example, the process can involve identifying which token contains only numeric characters. The volume unit can then be extracted from the non-numeric token using regular expressions (regex).

At step 1108, the process can handle cases where the answer has multiple tokens. In cases where the answer has multiple tokens, the answer can be split at the first alphabetic character. The numeric part after the split can be considered the volume value, while the remaining part can be treated as the volume unit.

At step 1110, the pack count can be checked. The pack count can be indicated along with the volume, separated by "x" or some other delimiter. By looking for "x" in the answer, the pack count information can be extracted.

At step 1112, the volume unit can be separated from the pack count. For instance, if the answer is "1 5L×6," the volume has already been extracted, leaving "L×6." This string is split on "x," resulting in "L" and "6." The pack count is identified as the numerical part from either side of the split, which in this case is "6."

At step 1114, depending on the data, fractional volumes given in the data can be separated by any non-alphanumeric character apart from "." which does not require separate handling. Usually, they are separated by spaces or commas.

At step 1116, using regex, the index of the first numeric character and the last index of the next token can be identified. This space volume can then be used to verify if the output extracted from distribution-based correction has any missing information.

At step 1118, the information extracted from distribution-based correction can be compared with the space volume. This comparison can be done by examining the length of the answer extracted for each product description. Any excess information from either source can be utilized to refine the answer further.

At step 1120, after the comparison, the final values for volume, volume unit, and pack count can be determined. This finalization ensures that the extracted volume information is accurate and complete, ready for use in further data processing and analysis. By following these steps, the process ensures that volume information extracted from product descriptions is precise, accurately divided into its constituent parts, and verified against various checks to maintain data integrity.

Figure 12:
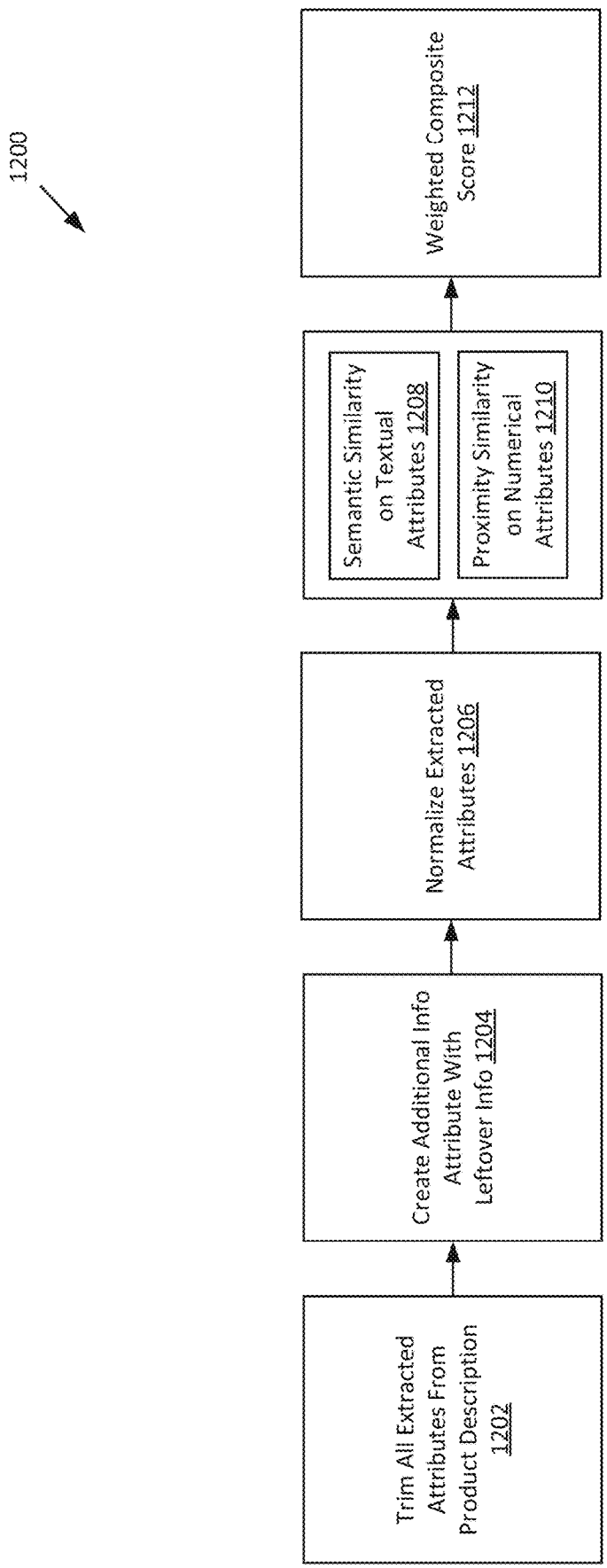
FIG. 12 is an example process of product matching, according to certain embodiments.

FIG. 12 is an example process 1200 for product matching, according to some embodiments. Some examples may include more steps, fewer steps, different steps, or a different combination of steps than the steps shown in FIG. 12. The product matching process can be performed by comparison system 106 as illustrated in FIG. 1. Products from various input sources that need to be matched, can be passed through all the previous modules and the original product descriptions along with harmonized attributes can be passed through the product matching system.

At step 1202, the product matching system can receive the extracted attributes and the processed description of both sources of data from the upstream systems. At step 1204, information present in the attributes can be removed from the processed descriptions to derive the additional information present in the descriptions. This additional information can be stored in a new attribute called "additional_info." At step 1206, the numerical attributes can be normalized to bring them in the same unit. For example, volume could be present in liter, milliliter, Fl. Oz., gallon etc. Each of these units can be converted to a base unit before the attributes are sent through the individual match score calculation. At step 1208, the textual attributes such as brand, flavor, container etc. can be converted into the equivalent mathematical representation for both the data sources. Once converted into the embeddings, semantic similarity can be calculated between the values of each attribute class separately. Semantic similarity can be calculated by taking the dot-product of the embeddings. At step 1210, the numerical features can be passed to a proximity-based similarity system that can determine similarity between attribute values.

At step 1212, once the individual similarities are calculated, they can be passed to a weighted composite score calculation system for calculation of the final score. This final score can be the conditional-weighted combination of the scores calculated for various textual and numeric attributes in the previous two modules.

The two variants of product matching can be used for providing required information to the pricing recommendation system. (1) competitor product matching, where a target product can be matched with its closest competition product; and (2) value-size matching, where a target product can be matched with other stock keeping units (SKUs) associated with different sizes of the target SKU.

Both matching variants can use the described product matching algorithm while considering different set of attributes for matching. According to some examples, all attributes except brand name may be considered for the competitor match. For value-size match, the products with the same brand may first be filtered as the target description. Then, the product matching can be run considering all other attributes except size, in this example, since the goal is to identify the same products with different sizes. The matching products with similarity score above a defined threshold can be passed to the pricing recommendation module along with their extracted attribute, similarity score and price.

The pricing recommendation engine can include a user interface (UI) where a user can select any product for which they want a price recommendation, and a recommendation logic can make use of the output from previous product matching system. The price recommendation engine involves a systematic approach to determining optimal pricing for products, integrating competitor analysis, internal product evaluation, and a comprehensive pricing algorithm.

The pricing recommendation engine can first conduct a detailed analysis of competitor products that are similar to the target product. This can involve calculating key statistical measures such as the average, median, and range of per unit prices for these competitor products, which helps account for differences in packaging sizes. These metrics provide essential guardrails for making informed pricing decisions, ensuring that the target product's price is competitive within the market landscape.

Next, the pricing recommendation engine can analyze a company's own products that are similar to the target product. This internal analysis can include identifying existing pricing strategies, understanding variations based on product attributes, and considering per unit pricing for different sizes. Additionally, the impact of price changes on sales and profitability for similar products with different sizes can be assessed. This internal review provides a comprehensive understanding of how different pricing strategies have performed historically, offering valuable insights for setting the target product's price.

Additionally, the pricing recommendation engine can apply a pricing recommendation algorithm that synthesizes insights from both competitor and internal product analyses. This algorithm can consider the extent of similarity between products and their per unit pricing. Various pricing strategies, such as cost-plus pricing, competitor-based pricing, and value-based pricing, can be integrated to recommend an optimal price. The algorithm can also employ a weighted average pricing approach, where the recommended price can be calculated as follows: Recommendation Price=(Competitor Average Price for Similar Products*Similarity Weight+Internal Product Price for Similar Products*Internal Product Weight)/Total Weight The similarity weight can reflect the importance placed on products with high similarity scores, which is the product of the similarity score and the similarity importance factor. The internal product weight can reflect the importance placed on the company's own similar products, considering per unit pricing of different sizes. These weights can be fine-tuned to align with business goals and customer preferences. Additional constraints are programmable, such as ensuring a minimum profit margin, maintaining a minimum price gap from competitors (especially for different segment offerings), and setting the price lower than smaller-sized products of the same kind while pricing them higher than larger products. This multi-faceted approach ensures that the recommended price is competitive, profitable, and strategically aligned with market dynamics and business objectives.

Figure 13:
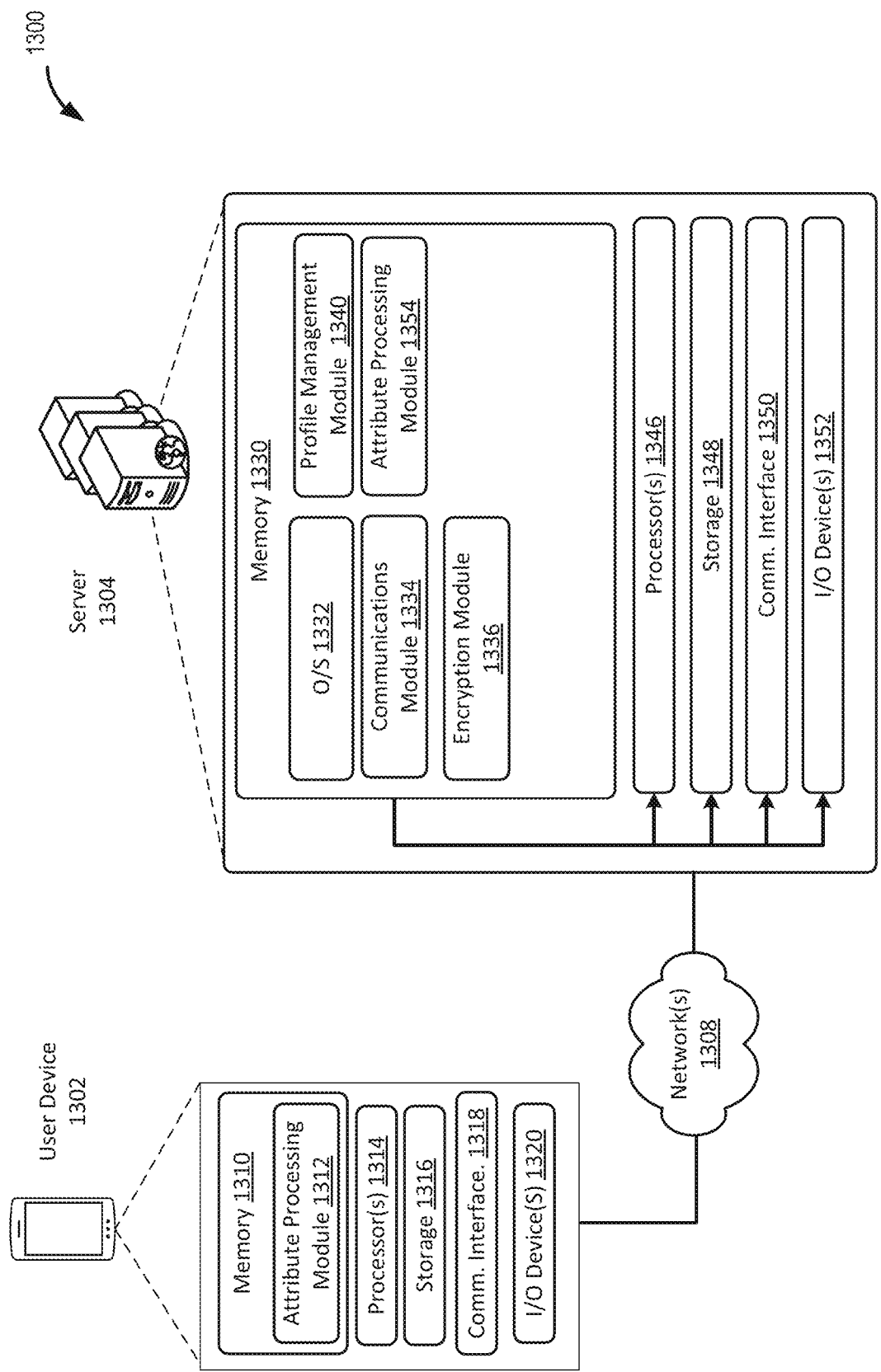
FIG. 13 is a block diagram illustrating an example system, according to certain embodiments.

FIG. 13 is a block diagram illustrating an example system, according to certain embodiments. In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs. The block diagram 1300 includes a user device 1302, a network 1308, and a server 1304. The server 1304 may correspond to one or more server computers (e.g., a server cluster) of a cloud computing platform, as described herein.

The network 1308 may include any suitable communication path or channel such as, for instance, a wire or cable, fiber optics, a telephone line, a cellular link, a radio frequency (RF) link, a WAN or LAN network, the Internet, or any other suitable medium. The network 1308 may include any one or a combination of many different types of networks, such as cable networks, the Internet, wireless networks, cellular networks, and other private and/or public networks.

Turning to each element in further detail, the user device 1302 may be any suitable computing device (e.g., a mobile phone, tablet, personal computer (PC), smart glasses, a smart watch, etc.). The user device 1302 has at least one memory 1310, one or more processing units (or processor(s)) 1314, a storage 1316, a communications interface 1318, and an input/output (I/O) device(s) 1320.

The processor(s) 1314 may be implemented as appropriate in hardware, computer-executable instructions, firmware or combinations thereof. Computer-executable instruction or firmware implementations of the processor(s) 1314 may include computer-executable or machine executable instructions written in any suitable programming language to perform the various functions described.

The memory 1310 may store program instructions that are loadable and executable on the processor(s) 1314, as well as data generated during the execution of these programs. For example, the program instructions may be for training an artificial intelligence model, receiving and/or generating inputs from and/or to an artificial intelligence model, and/or generating output using an artificial intelligence model.

Depending on the configuration and type of user device 1302, the memory 1310 may be volatile (such as random access memory (RAM)) and/or non-volatile (such as read-only memory (ROM), flash memory, etc.). In some implementations, the memory 1310 may include multiple different types of memory, such as static random access memory (SRAM), dynamic random access memory (DRAM) or ROM. The user device 1302 may also include additional storage 1316, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 1316 may be utilized to store a product catalog, input data (e.g., input data 150), user input (e.g., user input 112), extracted attributes (e.g., extracted attributes 160), a set of translations (e.g., set of translations 308), an answer set (e.g., first answer set 410), an attribute answer (e.g., attribute answer 634).

The user device 1302 may also contain the communications interface 1318 that allows the user device 1302 to communicate with a stored database, another computing device or server, user terminals, and/or other devices on the network(s) 1308. The user device 1302 may also include I/O device(s) 1320, such as for enabling connection with a keyboard, a mouse, a pen, a voice input device, a touch input device, a display, speakers, a printer, a touchscreen, etc.

Turning to the contents of the memory 1310 in more detail, the memory 1310 may include an operating system and one or more application programs or services for implementing the features disclosed herein, including attribute extraction system (e.g., attribute extraction system 102), an attribute harmonization system (e.g., attribute harmonization system 104), a comparison system (e.g., comparison system 106), and/or a recommendation system (e.g., recommendation system 108).

In some embodiments, the user device 1302 may first encrypt prompts that are transmitted to the server 1304. For example, the user device 1302 and the server 1304 may share an encryption key (e.g., a symmetric key), whereby the server 1304 receives an encrypted prompt and then decrypts the prompt using the encryption key.

It should be understood that one or more functions of the attribute processing module 1312 may be performed by the server 1304. In some embodiments, as described above the server 1304 may correspond to a cloud computing platform. The server 1304 may perform one or more functions, including, for example: receiving, a first input of (i) an arbitrary language and (ii) arbitrary values representing an attribute of the first input; generating, by at least using a first application programming interface (API) for a language detection model of the plurality of AI models, a set of predicted languages by using the first input as input to the language detection model; generating, by at least using respective APIs for different translation models of the plurality of AI models, a different language translation of the first input for each language in the set of predicted languages by using the first input as input to the different translation models; generating for each different language translation, by at least using a same second API for a same first question-answer model of the plurality of AI models, a respective answer based at least in part on a same input question prompt and the respective language translation and creating a set of answers that include each respective answer; storing the set of answers in a database; generating, by at least using the same second API for the same first question-answer model, an additional answer based at least in part on the same input question prompt and the first input; updating the set of answers in the database to include the additional answer; and/or performing a distribution-based correction, by at least using a distribution source and at least one answer included in the set of answers, to determine the attribute represented by the arbitrary values included in the first input.

The server 1304 comprises at least one memory 1330, one or more processing units (or processor(s)) 1346 such as central processing units and/or graphics processing units, a storage unit 1348, a communication device 1350, and an I/O device 1352. In some embodiments, these elements may be implemented similarly (or differently) than as described in reference to similar elements of user device 1302. In some embodiments, the storage 1316 may store input data (e.g., input data 150) and/or user input (e.g., user input 112) received by user device 1302. The storage 1316 may store an artificial intelligence model trained by the server 1304 and/or the user device 1302.

Turning to the contents of the memory 1310 in more detail, the memory 1310 may include an operating system 1332 and one or more application programs or services for implementing the features disclosed herein, including a communications module 1334, an encryption module 1336, a profile management module 1340, and/or an attribute processing module 1354.

The communications module 1334 may comprise code that causes the processor 146 to generate messages, forward messages, reformat messages, and/or otherwise communicate with other entities. For example, the communications module 1334 may receive and/or transmit data from and/or to the user device 1302. The communications module 1334 may also be responsible for providing notifications. In some embodiments, the communications module 1334 may provide a generated output using any suitable channel to any suitable device. For example, the communications module 1334 may transmit a recommendation to the user device 1302.

The encryption module 1336 may comprise code that causes the processor 1346 to encrypt and/or decrypt messages. For example, the encryption module 1336 may receive encrypted data from the user device 1302. In an example, the encryption module 1336 may transmit encrypted data (e.g., an encrypted audio output) to the user device 1302. The encryption module 1336 may include any suitable encryption algorithms to encrypt data in embodiments of the invention. Suitable data encryption algorithms may include Data Encryption Standard (DES), triple DES, Advanced Encryption Standard (AES), etc. It may also store (e.g., in storage unit 1348) encryption keys (e.g., encryption and/or decryption keys) that can be used with such encryption algorithms. The encryption module 1336 may utilize symmetric or asymmetric encryption techniques to encrypt and/or verify data. For example, as noted above, the user device 1302 may contain similar code and/or keys as encryption module 1336 that is suitable for encrypting/decrypting data communications with server 1304.

The profile management module 1340 may comprise code that causes the processor 1346 to maintain and store profiles of users (e.g., users of user devices, users of the server). Similarly, generated output from the attribute processing module 1312 and/or the attribute processing module 1354 can be associated with the user profile using the profile management module 1340 and used subsequently (e.g., for training, for validation, for presentation, etc.).

The attribute processing module 1354 may operate similar to processing module 1312. It should be understood that, in some embodiments, the operations of the attribute processing module 1354 may, additionally or alternatively, be performed by the user device 1302.

Illustrative techniques for training and using artificial intelligence models described herein may, but need not, be implemented at least partially by architectures such as those shown at least in FIG. 13 above. While many of the embodiments are described above with reference to servers and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU) and/or at least one graphics processing unit (GPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented by a computer system hosting a plurality of artificial intelligence (AI) models, the method comprising:
    causing a first user interface to be presented on a device;
    receiving, by the computer system and from the device, a first input of (i) an arbitrary language and (ii) arbitrary values representing an attribute of the first input;
    generating, by at least using a first application programming interface (API) for a language detection model of the plurality of AI models, a set of predicted languages by using the first input as input to the language detection model;
    generating, by at least using respective APIs for different translation models of the plurality of AI models, a different language translation of the first input for each language in the set of predicted languages by using the first input as input to the different translation models;
    generating for each different language translation, by at least using a same second API for a same first question-answer model of the plurality of AI models, a respective answer based at least in part on a same input question prompt and the respective language translation and creating a set of answers that include each respective answer;
    storing the set of answers in a database;
    generating, by at least using the same second API for the same first question-answer model, an additional answer based at least in part on the same input question prompt and the first input;
    updating the set of answers in the database to include the additional answer;
    performing a distribution-based correction, by at least using a distribution source and at least one answer included in the set of answers, to determine the attribute represented by the arbitrary values included in the first input; and
    causing, based at least in part on the distribution-based correction, the device or a different device to present a second user interface that presents a recommendation based at least in part on the attribute represented by the arbitrary values included in the first input.

2. The method of claim 1, further comprising:
    receiving, uncleaned input of the arbitrary language, an arbitrary formatting, and the arbitrary values from a data store of inputs; and
    generating the first input of the arbitrary language and the arbitrary values from the uncleaned input by at least: removing excessive white space, performing case normalization, inserting spaces, or removing repeating words.

3. The method of claim 1, further comprising:
    generating, by at least using (iii) a third API for a similarity determination model of the plurality of AI models that determines a similarity between the attribute and a predefined attribute and (iv) a similarity threshold, the predefined attribute by using the attribute as input to the similarity determination model.

4. The method of claim 1, wherein performing the distribution-based correction comprises:
    determining a priority indicator that includes at least one of: a frequency, a token length, a model answer confidence, or ensemble sorting; and
    setting an answer update threshold based at least on the priority indicator.

5. The method of claim 1, wherein the method further comprises:
    generating for each different language translation, by at least using a same third API for a same second question-answer model of the plurality of AI models, a respective second answer based at least in part on a same second input question prompt and the respective language translation and creating a second set of answers that include each respective second answer;
    generating, by at least using the same third API for the same second question-answer model, a second additional answer based at least in part on the same second input question prompt and the first input;
    adding the second additional answer to the second set of answers; and performing a second distribution-based correction, by at least using a second distribution source and at least one answer included in the second set of answers, to determine a second attribute represented by the arbitrary values included in the first input.

6. The method of claim 5, wherein the first question-answer model is a different question-answer model than the second question-answer model.

7. The method of claim 6, wherein the first question-answer model is an extractive question-answer model and the second question-answer model is an abstractive question-answer model.

8. The method of claim 1, wherein performing the distribution-based correction to determine the attribute comprises:
performing a first distribution-based correction, by at least using a second distribution source and an answer included in the set of answers, to determine a corrected attribute represented by the arbitrary values included in the first input, the corrected attribute used to determine the attribute represented by the arbitrary values included in the first input.

9. The method of claim 8, wherein performing the distribution-based correction to determine the attribute further comprises:
performing a second distribution-based correction, by at least using a third distribution source and the corrected attribute determined from at least two respective answers included in the set of answers, to determine a second corrected attribute represented by the arbitrary values included in the first input, the second corrected attribute used to determine the attribute represented by the arbitrary values included in the first input.

10. The method of claim 9, wherein performing the distribution-based correction to determine the attribute further comprises:
performing a third distribution-based correction, by at least using a fourth distribution source, the second corrected attribute, and a fourth corrected attribute determined based at least on using a second question-answer model of the plurality of AI models different from the first question-answer model, to determine a third corrected attribute represented by the arbitrary values included in the first input, the third corrected attribute equal to the attribute represented by the arbitrary values included in the first input.

11. A system hosting a plurality of artificial intelligence (AI) models, the system comprising:
one or more storage media storing instructions; and
one or more processors configured to execute the instructions to cause the system to:
cause a first user interface to be presented on a device;
receive, by the system and from the device, a first input of (i) an arbitrary language and (ii) arbitrary values representing an attribute of the first input;
generate, by at least using a first application programming interface (API) for a language detection model of the plurality of AI models, a set of predicted languages by using the first input as input to the language detection model;
generate, by at least using respective APIs for different translation models of the plurality of AI models, a different language translation of the first input for each language in the set of predicted languages by using the first input as input to the different translation models;
generate for each different language translation, by at least using a same second API for a same first question-answer model of the plurality of AI models, a respective answer based at least in part on a same input question prompt and the respective language translation and creating a set of answers that include each respective answer;
store the set of answers in a database;
generate, by at least using the same second API for the same first question-answer model, an additional answer based at least in part on the same input question prompt and the first input;
update the set of answers in the database to include the additional answer;
perform a distribution-based correction, by at least using a distribution source and at least one answer included in the set of answers, to determine the attribute represented by the arbitrary values included in the first input; and
causing, based at least in part on the distribution-based correction, the device or a different device to present a second user interface that presents a recommendation based at least in part on the attribute represented by the arbitrary values included in the first input.

12. The system of claim 11, wherein the instructions further cause the system to:
determine a corrected attribute by comparing the attribute and the first input.

13. The system of claim 11, wherein the recommendation is further based at least in part on second input received from a third user interface.

14. The system of claim 13, wherein the instructions further cause the system to:
add a second additional answer to the set of answers based at least on the attribute and the first input;
normalize at least one answer in the set of answers;
determine a similarity between the set of answers and the second input; and
present, by a fourth user interface, information represented by the set of answers, the set of answers within a predefined similarity threshold to the second input.

15. The system of claim 14, wherein the information includes at least one of:
an average value, a median value, or a value range.

16. One or more non-transitory computer-readable storage media storing instructions that, upon execution executable by one or more processors of a system hosting a plurality of artificial intelligence (AI) models, cause the system to perform operations comprising:
causing a first user interface to be presented on a device;
receiving, by the system and from the device, a first input of (i) an arbitrary language and (ii) arbitrary values representing an attribute of the first input;
generating, by at least using a first application programming interface (API) for a language detection model of the plurality of AI models, a set of predicted languages by using the first input as input to the language detection model;
generating, by at least using respective APIs for different translation models of the plurality of AI models, a different language translation of the first input for each language in the set of predicted languages by using the first input as input to the different translation models;
generating for each different language translation, by at least using a same second API for a same first question-answer model of the plurality of AI models, a respective answer based at least in part on a same input question prompt and the respective language translation and creating a set of answers that include each respective answer;

storing the set of answers in a database;

generating, by at least using the same second API for the same first question-answer model, an additional answer based at least in part on the same input question prompt and the first input;

updating the set of answers in the database to include the additional answer;

performing a distribution-based correction, by at least using a distribution source and at least one answer included in the set of answers, to determine the attribute represented by the arbitrary values included in the first input; and causing, based at least in part on the distribution-based correction, the device or a different device to present a second user interface that presents a recommendation based at least in part on the attribute represented by the arbitrary values included in the first input.

17. The non-transitory computer-readable storage medium of claim 16, wherein the operations further comprise:

generating for each different language translation, by at least using a same third API for a same second question-answer model of the plurality of AI models, a respective second answer based at least in part on a same second input question prompt and the respective language translation and creating a second set of answers that include each respective second answer;

generating, by at least using the same third API for the same second question-answer model, a second additional answer based at least in part on the same second input question prompt and the first input;

adding the second additional answer to the second set of answers; and performing a second distribution-based correction, by at least using a second distribution source and at least one answer included in the second set of answers, to determine a second attribute represented by the arbitrary values included in the first input.

18. The non-transitory computer-readable storage medium of claim 16, wherein the operations further comprise:

Performing a first distribution-based correction, by at least using a second distribution source and an answer included in the set of answers, to determine a corrected attribute represented by the arbitrary values included in the first input, the corrected attribute used to determine the attribute represented by the arbitrary values included in the first input.

19. The non-transitory computer-readable storage medium of claim 18, wherein the operations further comprise:

performing a second distribution-based correction, by at least using a third distribution source and the corrected attribute determined from at least two respective answers included in the set of answers, to determine a second corrected attribute represented by the arbitrary values included in the first input, the second corrected attribute used to determine the attribute represented by the arbitrary values included in the first input.

20. The non-transitory computer-readable storage medium of claim 19, wherein the operations further comprise:

performing a third distribution-based correction, by at least using a fourth distribution source, the second corrected attribute, and a fourth corrected attribute determined based at least on using a second question-answer model of the plurality of AI models different from the first question-answer model, to determine a third corrected attribute represented by the arbitrary values included in the first input, the third corrected attribute equal to the attribute represented by the arbitrary values included in the first input.

* * * * *